Figure 1:
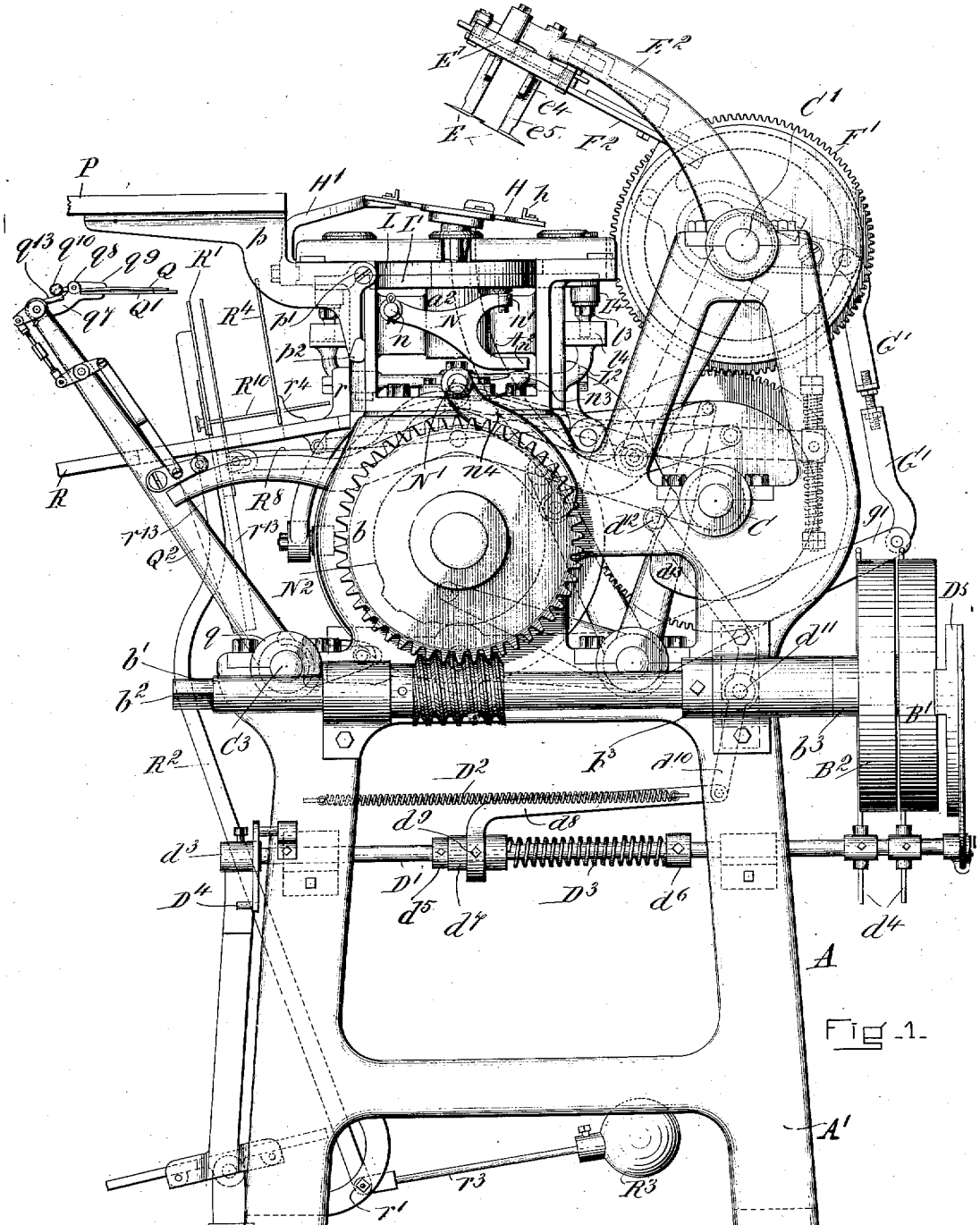

W. L. DIXON.
MACHINE FOR FOLDING BLANKS FOR CUFFS AND THE LIKE.
APPLICATION FILED OCT. 14, 1907.

956,950.

Patented May 3, 1910.

8 SHEETS—SHEET 1.

WITNESSES:
Frank G. Parker
John Buckler

INVENTOR:
Walter L. Dixon
by Donald Campbell
his Attorney.

W. L. DIXON.
MACHINE FOR FOLDING BLANKS FOR CUFFS AND THE LIKE.
APPLICATION FILED OCT. 14, 1907.

956,950.

Patented May 3, 1910.
8 SHEETS—SHEET 2.

WITNESSES:
Frank G. Parker,
John Buckler,

INVENTOR
Walter L. Dixon
by Donald Campbell
his Attorney.

W. L. DIXON.
MACHINE FOR FOLDING BLANKS FOR CUFFS AND THE LIKE.
APPLICATION FILED OCT. 14, 1907.

956,950.

Patented May 3, 1910.
8 SHEETS—SHEET 4.

WITNESSES:
Frank G. Parker
John Buckler

INVENTOR:
Walter L. Dixon
by Donald Campbell
his Attorney.

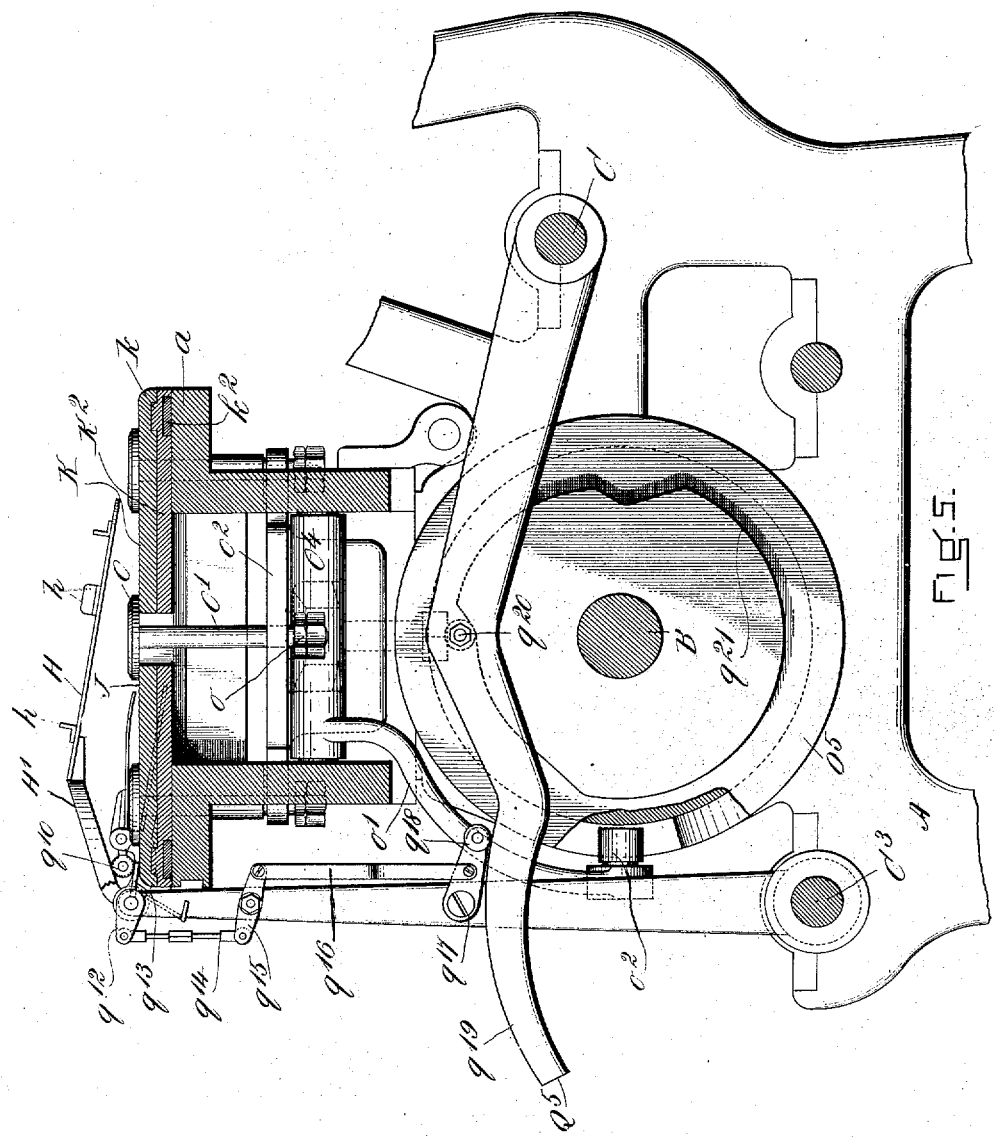

W. L. DIXON.
MACHINE FOR FOLDING BLANKS FOR CUFFS AND THE LIKE.
APPLICATION FILED OCT. 14, 1907.
956,950.
Patented May 3, 1910.
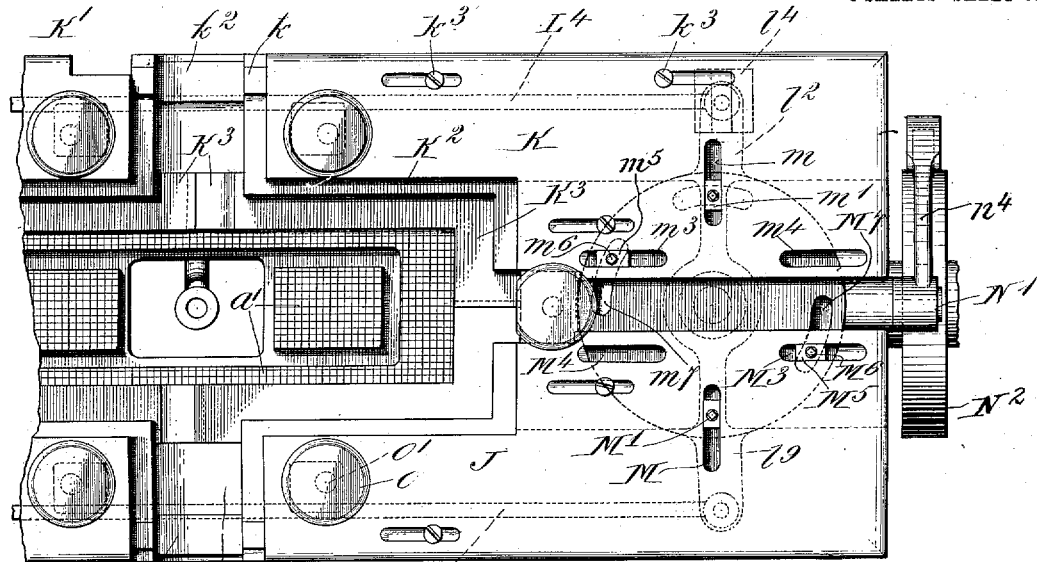
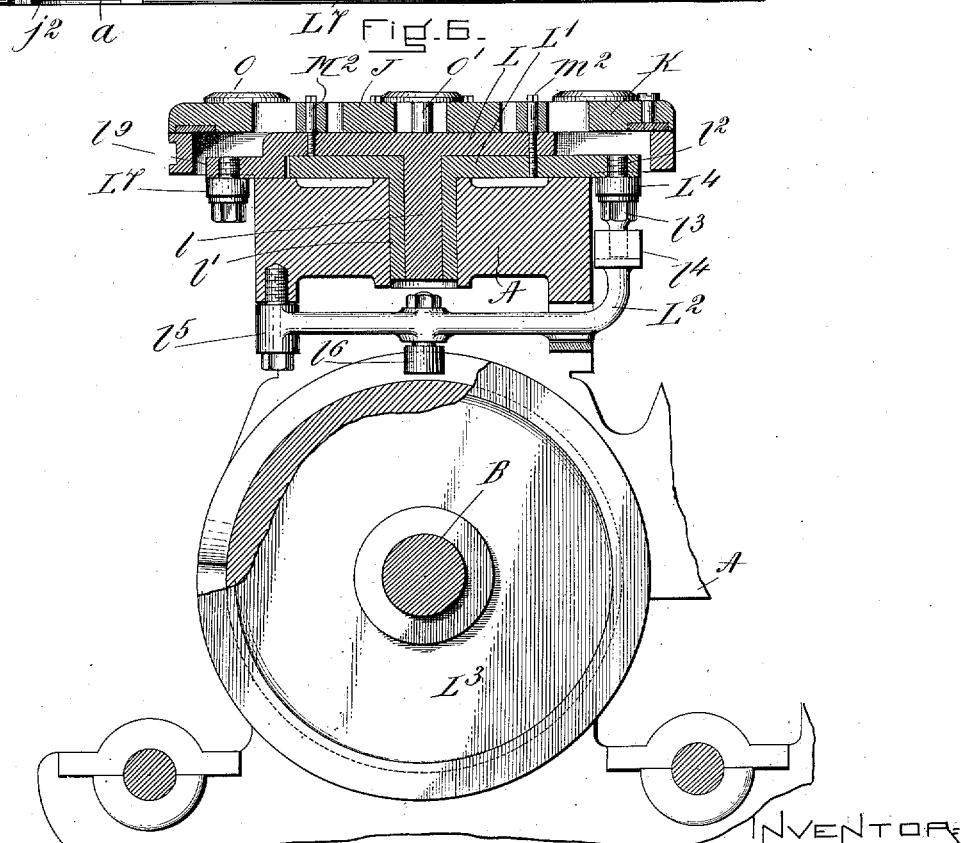
WITNESSES:
Frank G. Parker
John Buckler
INVENTOR
Walter L. Dixon
by Donald Campbell
his Attorney.

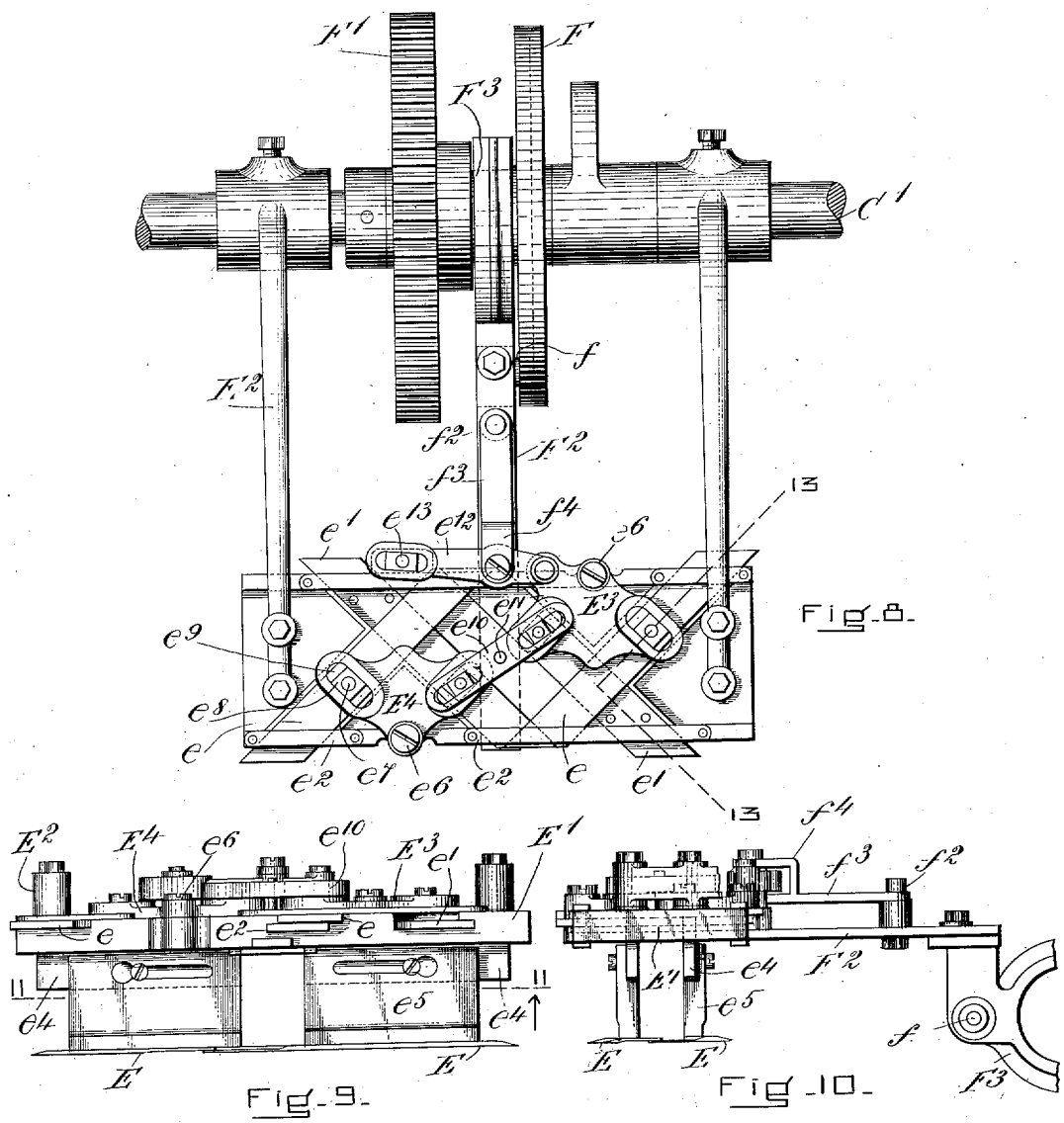

W. L. DIXON.
MACHINE FOR FOLDING BLANKS FOR CUFFS AND THE LIKE.
APPLICATION FILED OCT. 14, 1907.

956,950.

Patented May 3, 1910.
8 SHEETS—SHEET 8.

WITNESSES:
Frank G. Parker
John Buckler

INVENTOR:
Walter L. Dixon
by Donald Campbell
his Attorney

UNITED STATES PATENT OFFICE.

WALTER L. DIXON, OF MILFORD, MASSACHUSETTS, ASSIGNOR TO REECE FOLDING MACHINE COMPANY, OF BOSTON, MASSACHUSETTS, A CORPORATION OF MAINE.

MACHINE FOR FOLDING BLANKS FOR CUFFS AND THE LIKE.

956,950.     Specification of Letters Patent.     Patented May 3, 1910.

Application filed October 14, 1907. Serial No. 397,440.

*To all whom it may concern:*

Be it known that I, WALTER L. DIXON, a citizen of the United States, residing at Milford, in the county of Worcester, State of Massachusetts, have invented a new and useful Machine for Folding Blanks for Cuffs and the Like, of which the following is a specification.

My invention relates to machines for folding blanks for cuffs and like articles, for example, collars, shirt bosoms, etc., which are usually composed of layers of fabric secured together as by sewing to form the cuff or other garment. In the manufacture of such articles, it has become common to prepare the separate layers of fabric by cutting pieces larger than the completed article and inturning or infolding the edges of such pieces or blanks upon a die or templet which is properly constructed for defining the shape or contour of the finished article. Two of such folded blanks are then placed together with the folded-in edges concealed, and the same are stitched together as upon a sewing machine. Such a templet as the one referred to is usually part of a machine which comprises other instrumentalities, for example, infolders or means for infolding the edges of the fabric blank over the edges of the templet; swinging arms or other positioning mechanism for the templet; a cross-head including working mechanism by which the templet may be expanded and contracted when an expanding and contracting templet is to be employed; mechanism by which the folds of the blanks can be squeezed under high pressure and with the application of heat so as to permanently iron or fix the crease and prevent subsequent distortion of the folds; and feeding mechanism for handling the blanks, either before or after being folded. Together with the above instrumentalities should be mentioned the frame-work and the power shaft and connections carried thereby.

My invention is illustrated in a machine comprising all the above instrumentalities; and the objects which will appear best upon reading the specification following, relate to securing greater efficiency and greater ease of manipulation enabling a more rapid operation and greater output, and also to the securing of greater accuracy in the production of folded blanks and the avoidance of handling thereof until a number of the same are automatically arranged to form a bunch ready to be transferred to the operator of a sewing machine.

I will first describe a form of machine embodying my invention and will then point out the novel features thereof in the claims.

Figure 2:
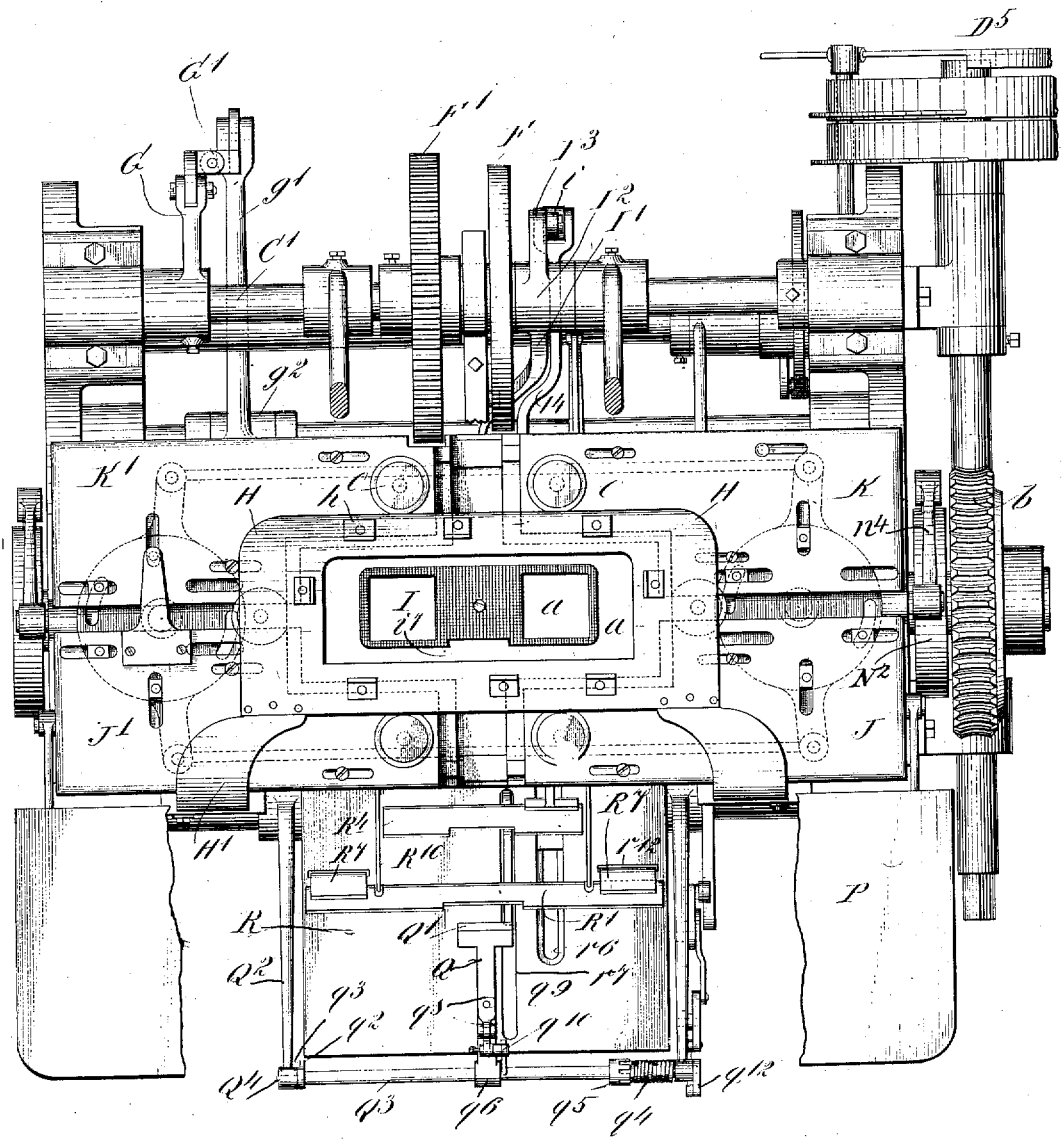
Figure 3:
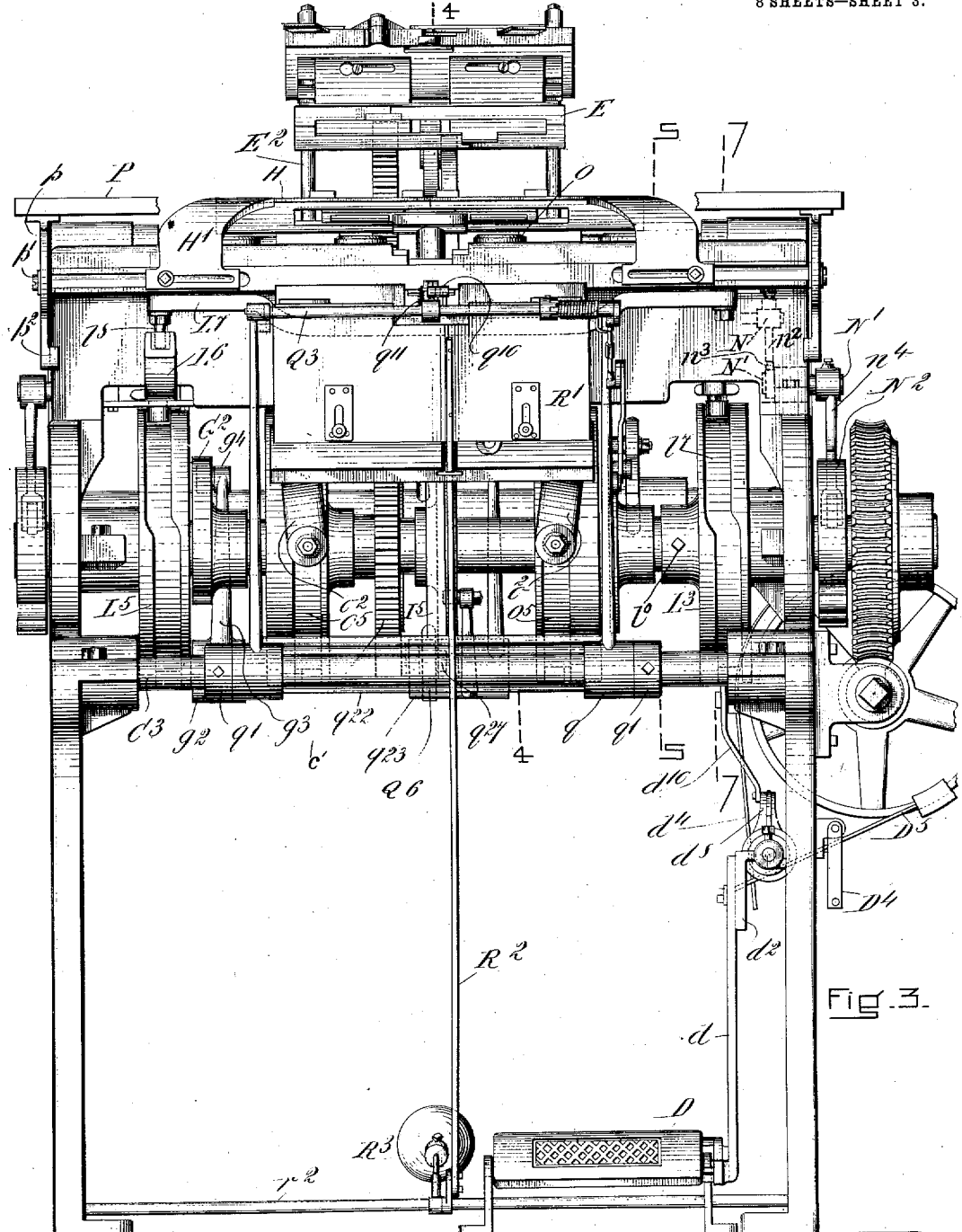
Figure 4:
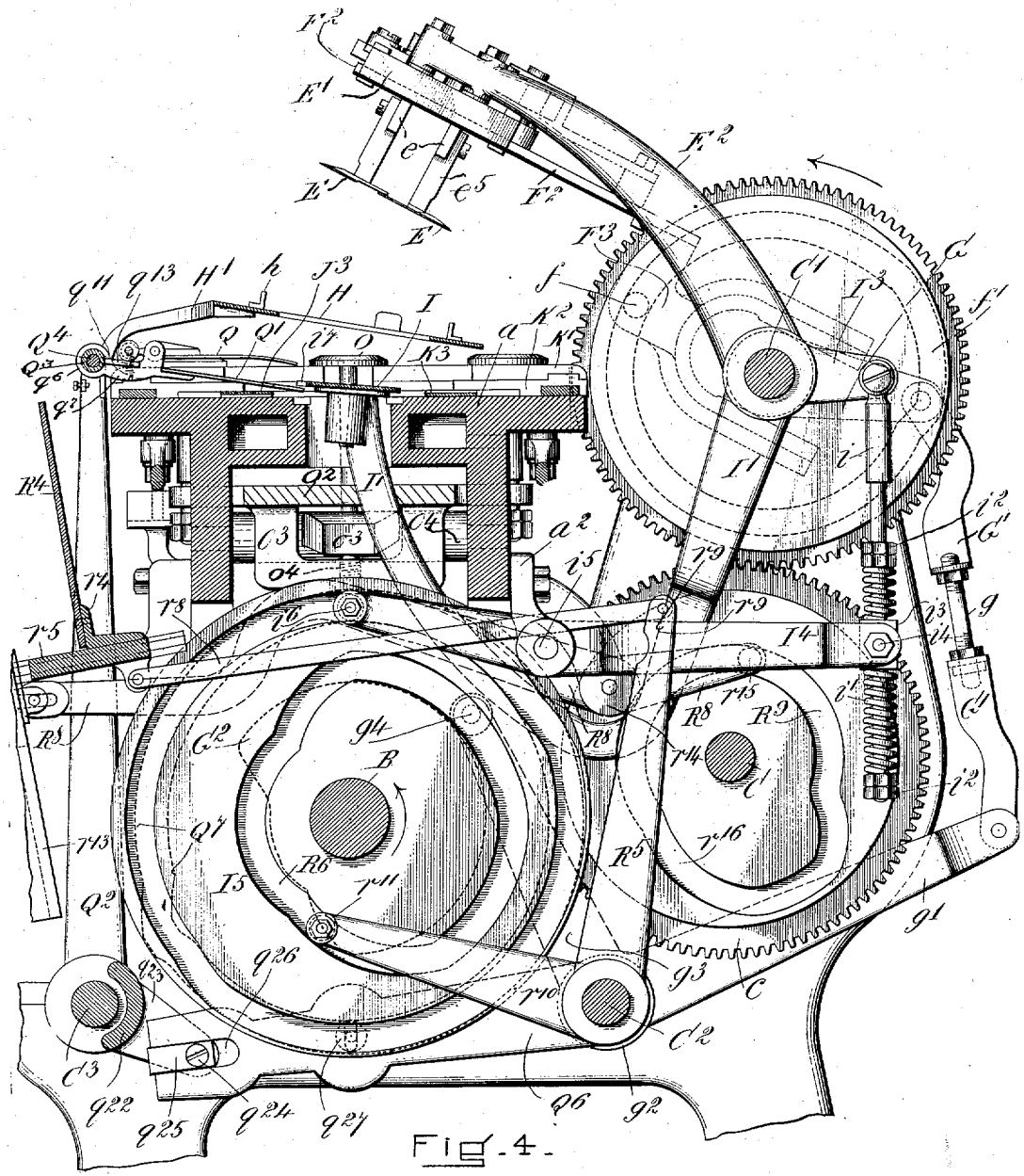
Figure 11:
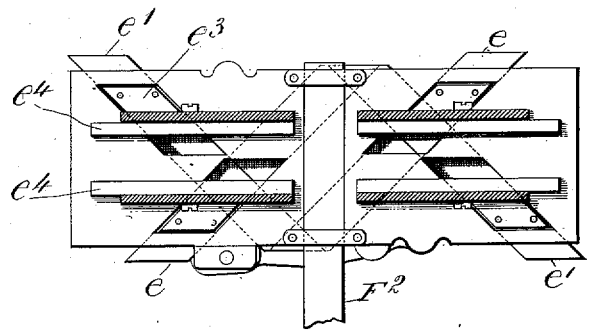
Figure 12:
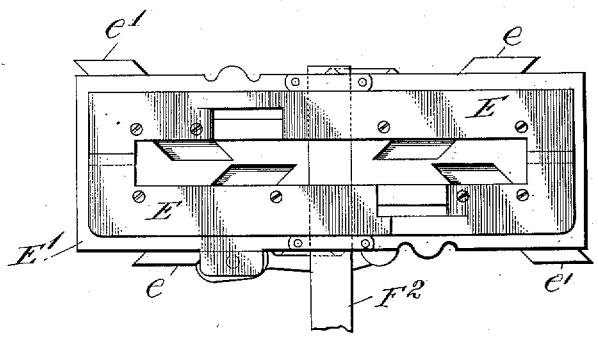
Figure 13:
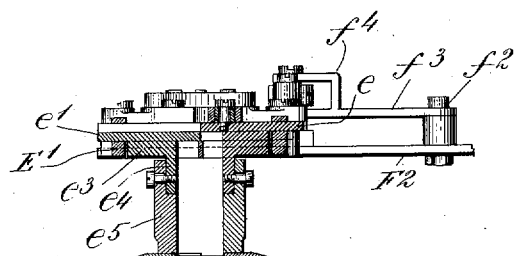

In the accompanying drawings, Figure 1 represents an end elevation of a power operated folding machine embodying the improvements hereinafter set forth. Fig. 2 is a top view of the same, with the cross-head and templet and the arms supporting them broken away so as to more clearly illustrate the top of the machine bed. Fig. 3 is a front elevation of what is shown in Fig. 1. Fig. 4 is a cross sectional elevation taken upon the plane 4—4 of Fig. 3, and showing on a larger scale the details of certain interior cam mechanism. Fig. 5 is a similar cross sectional view taken on the plane 5—5 of Fig. 3, showing further interior details. Fig. 6 is a top view of the machine bed, certain parts being removed that are visible in Fig. 2. Fig. 7 is another sectional elevation showing interior mechanism and taken on the plane 7—7 of Fig. 3. Fig. 8 is a top view of the cross-head which carries the templet plates, the cross-head supporting arms and a portion of the shaft upon which the same oscillate. Fig. 9 is a front elevation of the cross-head and templet shown in Fig. 8. Fig. 10 is an end elevation thereof. Fig. 11 is a sectional view taken on the plane 11—11 of Fig. 9, and looking upward. Fig. 12 is a bottom plan view of said cross-head and templet. Fig. 13 is a detail view of the cross-head mechanism taken on the plane 13—13 of Fig. 8.

Similar characters of reference are employed to designate corresponding parts in the several figures of the drawings.

*Frame and frame parts.*—A cast frame work A constitutes the substructure for the particular form of my invention illustrated in the drawings. This needs no extended description. It comprises legs A′ which make the machine of a proper height for an operator. Rigid with the frame (Figs. 4 and 6) is the bed $a$, which may be a steam chest, steam being a convenient mode of heating the bed to assist in the folding and pressing operations. The bed is open centrally to accommodate the lifter I and operating parts. The bed forms a support for blanks for the cuff, collar or shirt bosom during the folding and pressing operations. Its blank supporting surface is scored as shown at $a'$, to prevent displacement of the blank during operation.

Throughout the following description the front of the machine will be considered that side on which the operator stands, namely, at the bottom of the drawing Fig. 2; and the right and left sides, will be the right and left sides as viewed by the operator, i. e., as viewed in Fig. 3.

*Main power shaft and drive mechanism.*— The main power shaft is marked B, see Figs. 1, 2, 3. It turns in fixed bearings and may be driven at say 20 revolutions per minute by the following: A worm wheel $b$ at the right is fixed to shaft B, and engages a worm on worm shaft $b'$ which may revolve say 1,000 revolutions per minute. The worm shaft turns in fixed bearings; its forward end is squared at $b^2$ so that a crank may be applied for giving motion to the machine when desired, as when making adjustments or repairs; and its rear end is provided with the usual collars $b^3$ $b^3$ to prevent longitudinal movement, and with fast and loose pulleys B' and B² intended to be engaged by a driving belt from the usual overhead shafting of a machine shop.

A belt shifter and brake will be described with the double acting treadle, which operates them.

*Longitudinal shafts and axles.*—There are several other shafts and axles which, like the main shaft, carry various gears and cams, either fast or loose, taking part in the actuation of different of the instrumentalities making up the machine. See Figs. 1 and 4. The most important is the auxiliary shaft C which rotates in harmony with the main shaft through gears $c$ and $c'$ fast on the former and latter respectively. Then there is the oscillating shaft C' at the upper rear, which carries the templet or crosshead mechanism, and also has cams not fast but driven from other sources. Then there are non-rotating axles C² toward the rear and C³ toward the front, on which different levers, etc., turn as fulcrums.

*Power controller.*—The controller of the power takes the specific form of a treadle in the machine illustrated, although my broad invention does not exclude hand control. See Figs. 1, 3.

D is the treadle. Rigid with it is an arm $d$ that extends upwardly, its upper end having a lug $d^2$.

D' is a rearwardly extending rod sliding in fixed bearings and having a collar $d^3$ at its forward end, which the lug $d^2$ engages to force the rod rearward when the treadle is depressed at its rear. This brings a belt shifter $d^4$ $d^4$ into play and transfers the driving belt from the loose to the fast pulley B'. This rearward movement is effected against the opposition of a helical spring D².

$d^5$ and $d^6$ are collars fast on rod D'. $d^7$ is a collar loose thereon.

$d^8$ is a link, yoked and pivoted at $d^9$ to sleeve $d^7$. Spring D² is connected to link $d^8$ and to the frame, and exerts the tension to pull link $d^8$ and rod D' forward when they are free to move. D³ is a stronger spring, confined between loose collar $d^7$ and fast collar $d^6$. Usually it does not come into play. Link $d^8$ at its rear connects with a bent lever $d^{10}$ pivoted at $d^{11}$ and extending beyond the pivot, to where it has a roller $d^{12}$ engaging a peculiar cam $d^{13}$ fast on auxiliary shaft C. This cam has one deep run corresponding to the idle position of the machine.

The parts are shown in a position with the treadle slightly thrown. By throwing the treadle completely rod D' moves back, belt is shifted, machine starts and at the same time roller $d^{12}$ moves away from the center of cam $d^{13}$. The peripheral portion of the cam immediately passes under the roller and precludes the roller and the connected lever $d^{10}$ and link $d^8$ from returning under influence of spring D² to idle position. The machine will then run an entire revolution or cycle before roller $d^{12}$ can drop back into the cam, and spring D² return parts to idle position. This enables the operator to infold one blank and have an automatic stoppage at the point of time when a new blank is to be inserted. Usually this is unnecessary and I provide a latch D⁴ which may be thrown over at will in front of the rod D' so as to block it and maintain the driving belt on the fast pulley B' as long as desired.

D⁵ is a brake carried by rod D'. See Figs. 1, 2, 3. When the belt is carried to the idle pulley B² the brake is brought into contact with the fast pulley B' at its periphery which stops it and prevents further movements of the machine from momentum. The use of worm and gear $b$, $b'$ also assists this.

The utility of spring D³ is that without it the operator could not possibly stop the machine except at the end of a cycle or revolution, which might be the cause of great damage. He has merely to exert a pressure on the forward end of the treadle sufficient to overcome spring D³ and compress it between sleeves $d^6$ and $d^7$ in order to move the rod D' forward, thus shifting the belt and applying the brake.

*The templet.*—Thus far I have only described general machine parts. In coming to the parts which handle and operate upon the blanks it should be premised in a general way that there is illustrated a means for properly placing the blank in the machine, a templet which defines the outline of the completed article, infolders for folding the blank edges over the edges of the templet, means for extracting the templet from the folds, means for pressing the folds in contact with the heated bed, means for removing the blanks after being folded and pressed, a device for stacking the blanks so removed, and a number of other means, mechanisms and concomitants auxiliary to the general operations.

The templet, strictly speaking, consists of the part defining the blanks, in this case, the four templet plates or blades E. See Figs. 1, 3, 4, and 8 to 13. The parts to which these are attached, and the stock or casting in which they move may be designated as a whole the "crosshead". The templet E is carried by the crosshead E', and this in turn is carried by arms $E^2$ which are fast on the oscillating shaft C' by which the elevating and lowering of the templet is effected. The machine illustrated is for cuffs having two square and two round corners, and the templet is made up of four plates, which by mutual approach are made to withdraw from the folds of the cuff blanks by a contraction. For an article of the shape of a cuff a templet with diagonally contracting and expanding plates is suitable. To this end the crosshead body E' is made with four diagonal slideways on its upper side in which slide four slides $e$, $e$, $e'$, $e'$. As the slides cross each other, two slideways are made deeper than the other two, so that slides $e$ may pass above slides $e'$. These slides may be removed by taking off the strips $e^2$. Each slide connects through the crosshead body with a templet plate, as follows: The horizontal portion $e^3$ of a templet guide block is screwed to the under side of a slide so as to move with it. To permit this, holes are formed in the crosshead from upper to lower surface. Each guide block has its horizontal portion $e^3$ and a downward lug $e^4$ arranged longitudinally instead of diagonally to the crosshead. Each guide block has adjustably screwed to its downward portion $e^4$ a downwardly extending templet holder $e^5$, and to this latter is directly connected the templet E which may be removed or replaced for adjustment or repair. For causing movements of the templet plates, guide blocks, and connected slides, I prefer mechanism which moves all at once, whereby the templet will contract and expand as a whole. See Fig. 8.

$E^3$ and $E^4$ are two similar slide actuators, each being pivoted at $e^6$ to the crosshead body E', and each similar to a bell-crank lever. The outer end of each branch of each actuator is operatively connected with one of the diagonal slides $e$, $e'$. The connection may comprise a pin $e^7$ projecting from the slide, a block $e^8$ turning on the pin $e^7$, and a short slot formed at $e^9$ in the actuator, and in which the block slides. A straight lever $e^{10}$ pivoted at $e^{11}$ has similar slot and block connections with both the actuators, and is the means of both the actuators moving in harmony. Another straight lever $e^{12}$, having a similar slot and block connection at one end with a fixed pin $e^{13}$, is connected at its other end with actuator $E^3$, and at its middle is connected with a link $f^3$ forming part of the mechanism through which power is transmitted to the actuators $E^3$ and $E^4$, as will now appear.

*Power connections for actuating templet.*—For transmitting power to the templet I prefer a cam mounted on the oscillating shaft C'. F represents a face cam for this purpose. It is mounted on the same sleeve, loose on shaft C', that carries a gear F'. The latter meshes with a gear $c$ fast on the auxiliary shaft C and through which gear $c$ said auxiliary shaft is driven, as already stated. In this way continuous rotation is given to cam F when the machine is in operation. The cam F causes the reciprocation of a bar $F^2$, whose forward end is for convenience fitted slidingly in the bottom of the crosshead body, and to whose rear end is connected the yoked piece $F^3$ (dotted in Fig. 4) which straddles shaft C'. A pin or roller $f$ on yoked piece $F^3$ engages the dwell $f'$ on the left face of face cam F. This dwell is principally concentric, but has two oppositely acting eccentric portions, as will be clear from the dotted lines, Fig. 4. The eccentric portions serve to push bar $F^2$ out, then pull it rearward. Fig. 10 well shows the relation of yoke $F^3$, bar $F^2$ and pin $f$. Pivoted at $f^2$ to bar $F^2$ is a link $f^3$. This extends directly forward and is there yoked at $f^4$ and pivoted, as already stated, to the middle of the straight lever $e^{12}$ which in turn transmits movement to the actuators $E^3$, $E^4$, slides $e$, $e'$ and templet plates E. The cam F is so timed that the templet will collapse after the folding but before the pressing operations on the blank, and expand again before the folding operation upon the next blank.

*Power connections for swinging templet.*— The templet will be swung downward preceding each folding operation, and upward after the folding and the contraction of the templet are done. The means for effecting such swinging are best seen in Figs. 2 and 4. G is an arm formed on a collar made fast to shaft C', and extending rearward. It has pivoted at its end a link G', adjustable as to length by a device $g$; the link extending downward to where pivoted to an arm $g'$ of a bell crank lever, the hub $g^2$ of the latter being loose upon the fixed longitudinal axle $C^2$. The other arm $g^3$ of the bell crank lever, dotted in Fig. 4 (see Fig. 3), extends upward, has a roller $g^4$ at its end, and engages the periphery of an "outside cam"

G² fast upon and which rotates with the main shaft B. The weight of the crosshead keeps roller g⁴ pressed against the rim of cam G². As the cam G² rotates and the roller passes the eccentric portions, the crosshead and templet are first permitted to lower and afterward forced to rise; but they can be lifted by hand at any time, such lifting by hand merely serving to move roller g⁴ away from cam G².

*Blank supporting wings.*—These, marked H, H, form an elevated platform, see Figs. 1, 2, 3, 5, which is held upon fixed castings, H', H'. Upon these wings, not immediately upon the bed a, does the operator insert the blanks which are to be folded, the latter being automatically transferred to the bed when the templet descending, passes through the central aperture in the wings. The wings lie in a plane that is nearly coincident with the shaft C' for a purpose that will appear. Gages h, h, on the wings assist the operator in accurately inserting the cloth blanks. The wings themselves are a great assistance and constitute an improvement upon the operator placing the blanks directly on the heated bed, the latter being much less accessible than the wings and liable to burn the fingers. Of importance also is their function of receiving a new blank while the preceding one is undergoing a later, *e. g.* the pressing operation.

*Blank lifter.*—When the descending templet meets the unfolded blank resting on the wings, it coöperates with another element, the lifter I, the latter movable upward and downward between the bed a and wings H. The blank, held between the templet and lifter is carried down through the aperture in the wings, to the heated bed, where it is folded and pressed; after which the lifter lifts the folded blank above the bed as part of the operation of removing the blank from the machine. Fig. 1 shows lifter I elevated, its upper surface coincident with the plane of the wings, ready to carry the blank down. Fig. 2 shows it to be of open or skeleton construction. Fig. 4 best shows the connections. The lifter is moved by connections comprising a spring to avoid breakage, and so as to swing about the same shaft C' as a center, that forms a center for the templet. This is important, so that the two may move in perfect accord when carrying a blank from the wings to the bed. I' is an arm by which this is accomplished. It is of irregular shape so as to clear the bed and other parts when swinging. Its swinging about shaft C' is permitted by its loose hub I² mounted on the latter. Fast to hub I² is a second arm I³, through which the turning of the hub and swinging of the lifter are effected.

Depending from arm I³ is a rod i pivoted to I³, and having an elastic pivotal connection with a power-actuated lever I⁴. The elasticity is provided through a strong helical spring i', or two such springs, held on rod i between nuts i², i². A sleeve i³ on rod i is elastically held in normal position by the springs i'. At i⁴ the lever I⁴ is pivoted to sleeve i³. Lever I⁴ extends forwardly to its fixed pivot i⁵ on a lug a², and beyond, to where it is provided at i⁶ with a pin or roller which engages with the main dwell of a cam wheel I⁵, fast on the main shaft B. This cam has eccentric portions so timed as to elevate the lifter in time to meet the descending templet, and assist transferring the blank from the wings to the bed; and after the folding and pressing to lift the folded blank to assist in its removal from the machine.

As will be clear from Fig. 4, the blank lifter I when down, fits into recesses in the bed, so as to lie flush with the latter; the blank then lying flat on the bed (and lifter) and held down by the templet, which defines its outline. At this stage the infolders come into play to turn the blank edges over the edges of the templet, into the form of the cuff.

*The infolders.*—These primarily are to move inwardly and outwardly and infold the blank edges; but in the present embodiment are also used for the operation of pressing the blank edges, to fix and crease them, this being accomplished between the infolder and the bed and after the templet has collapsed out of the folds. A series of infolders are used; four are shown, one at each corner of the blank. See Figs. 2, 5, 6, 7. The two front infolders, and two rear ones, are substantially alike. Taking the right hand rear infolder as representative of the others (see Figs. 5 and 6), the same is made in two parts or plates, one superimposed upon the other. K being the upper plate, the under one is marked K², and it forms an adjusting plate, being adjustable relatively to K for variations in sizes of the cuffs or other articles being manufactured. A rib k formed on K² runs in a groove in the infolder K and thereby preserves proper alinement between K and K² while permitting longitudinal movement for adjustment.

In order to preserve alinement between the infolder just described, and that at the rear left hand corner of the machine, a long bar k² is employed, which rests on top of the bed a and engages with longitudinal grooves formed respectively in the infolders, permitting the latter two to approach each other or recede while maintaining them in alinement. A similar bar for effecting alinement of the front infolders, is shown at j².

k³, k³ represent screws passing through slots in infolder K for adjustably securing the latter to the plate K².

It will be understood that the infolders of the series are intended to be moved inwardly and outwardly; the inward movements intended to effect the actual folding of the blanks; and the outward movements, the removal of the infolders therefrom. The inward movements may be of a variety of descriptions, either a rectilinear movement, diagonal or otherwise, or a compound movement with components first in one direction and then in another in accordance with the style of the article or the conformation of the sides or corners thereof. For example, when lock corners are to be produced, the inward movement of each infolder will be first endwise and then sidewise, or vice versa. The portion which actually contacts the edges of the blanks in the process of inturning them should be thin, and they are so shown as at $J^3$ and $K^3$, Fig. 4, these thin plate-like portions being connected to the adjusting plates $K^2$.

*Infolder actuating mechanism.*—Connections from the power shaft drive the infolders. Each infolder is moved inward after the blank has reached the bed with the templet bearing on top of it. After the templet collapses the infolders are caused to press, and thereafter they move outwardly.
At each end of the machine, beneath the infolders are a pair of superimposed actuating disks. L, the upper one and L′ the lower, are shown in elevation in Fig. 1, in dotted plan in Fig. 6, and in central vertical section in Fig. 7. Disks L and L′ are rotatable on vertical axes, L′ having a cylindrical downward extension $l'$ for rotation in a hole bored in a fixed cross member $a^2$ while L has its extension $l$ rotating in a central hole bored in $l'$, Fig. 7. The bottom disk L′ has a rearward extension at $l^2$, Fig. 7, through which it is oscillated; said extension provided with a downwardly projecting pin $l^3$, whose lower end engages a recessed piece $l^4$ at the end of an oscillating lever $L^2$, Figs. 1, 7. The forward end of lever $L^2$ is pivoted to the frame at $l^5$; its middle portion has a pin or roller $l^6$ which projects downwardly into the groove $l^7$ of a power driven cam $L^3$, Figs. 3 and 7. The cam $L^3$ is adjustably secured as by a set screw $l^0$ on the main shaft B, its adjustment permitting a variation in the stage at which the infolders are actuated. The dwell $l^7$ has oblique portions which oscillate the lever $L^2$ and the disk L′. It should be explained that the section Fig. 7 taken on plane 7—7, Fig. 3, shows the mechanism at the right end of the machine, and for oscillating the lower disk L′, and in fact both lower disks, a long connecting link $L^4$ serving to transmit the motion from pin $l^3$, Fig. 7, to a similar pin on the lower disk at the left end of the machine. The dotted lines Fig. 6 show this link connection. The two upper disks, those at the right and left are actuated from a cam $L^5$, Fig. 3, similar to cam $L^3$, but located near the left end of shaft B. Cam $L^6$ acts directly on oscillating lever $L^6$ (similar to $L^2$) which connects with pin $l^8$ secured to a forward extension of the left hand disk L; and the long connecting link $L^7$ which extends from pin $l^8$ is plainly seen in Fig. 3, partly dotted where it dips down in crossing the center of the machine. Fig. 6 shows dotted in top view how this link $L^7$ connects with the extension $l^9$ of upper disk L at the right. It will be observed that the right hand oscillating lever $L^2$ which actuates the lower disks L′, is pivoted at the front, its moving end being at the rear; whereas the oscillating lever $L^6$ at the left of the machine and which serves to move the upper disks L, is reversely arranged, being pivoted at the rear. Suppose now, the two actuating cams $L^3$ and $L^5$ are secured upon the main driving shaft B in corresponding positions as shown in Fig. 3, then as the main shaft rotates in the regular operation of the machine there will be caused oscillations of the two lower disks in one direction and at the same instant oscillations of the two upper disks in the reverse direction. One pair will move in the direction of the hands of a watch, while the other pair moves the other way. By altering the relative positions of the cams $L^3$ and $L^5$ upon the shaft B, the order of movement may be correspondingly changed. Between the lower disks and the upper disks on the one hand, and the infolders on the other hand, are certain connections which will next be described; these being substantially the same for the two ends of the machine, that only at the right end (see Figs. 6 and 7) need be explained.

*Adjustable infolder connections.*—The adjustments about to be described together with the already mentioned adjustment of the cams $L^3$ and $L^5$ on the driving shaft, are extremely important and valuable, rendering the machine practically universally adjustable as to the form and manner and order of producing infolds on blanks.
The apparatus is such as to render the application of movement to the infolders practically independent as to the longitudinal and lateral components. Lengthwise motion is produced by force applied at one point, sidewise motion at another point, and the speeds and order of such movements being variable at will, any desired resultant is obtainable.

M, $m$ represent slots in the front and rear infolder parts J, K, respectively, said slots extended crosswise relatively to the machine, and forming part of the means through which lengthwise motions are imparted to the infolders. In each slot plays a block M′, $m'$. Each block has a rotatable pin within it, M², m², which pins extend downwardly. Pin M² connects to upper disk L, so that oscillation of said disk moves the infolder part J lengthwise. Pin m² connects to lower disk L', a concentric slot in the upper disk being provided to allow this; and thereby infolder K moves lengthwise when the lower disk oscillates. With the disk adjustment already stated, the concurrent but opposite rotation of the disks, would obviously cause the two right end infolders to move inward simultaneously, or outward simultaneously. This motion, however, is merely a lengthwise component. A component at another angle must be obtained in order that the infolders may operate upon the blank sides as well as their ends. The front infolder has two other slots M³ and M⁴, and rear infolder corresponding ones m³ and m⁴; all extending lengthwise and for producing crosswise movements. Two of these, M⁴, m⁴, are not shown as in use, but intended for use with variations of adjustment from that shown. In each of the slots M³, m³, plays a block M⁵, m⁵, and each block (similarly to blocks M', m') has a rotatable pin M⁶, m⁶, passing through it, and these pins extend downwardly. At their lower ends the pins M⁶, m⁶ connect directly with the lower disk L' so as to receive motion from said disk. It will thus be seen that when the lower disk oscillates and conveys motion to the blocks M⁵, m⁵, the latter will so act within the slots M³, m³, as to cause transverse or crosswise movements of the infolders. In order to permit the communication of motion from the lower disk to the infolders through blocks M⁵, m⁵, the upper disk has to be cut away, for example, in the form of concentric slots M⁷, m⁷, which slots are similar to the slot already mentioned for permitting the operation of block m'. If it were desired that one or both of the infolders should receive its crosswise motion from the upper disk rather than the lower disk, then the block M⁵ or m⁵ would be transferred from the slot M³ or m³ to the slot M⁴ or m⁴.

With the adjustment of disks as shown, the right front infolder, for example, when the disks are oscillated, in reverse directions as explained, will (see Fig. 6) be moved lengthwise to the left by the oscillation of the upper disk in the direction of the hands of a watch, the block M' effecting this movement; whereas, its crosswise movement from the front to the rear will be received from the lower disk rotating in an opposite direction and through the block M⁵. These taking place simultaneously, the resultant will be a plane or straight diagonal movement of the infolder J so as to simultaneously fold a portion of the front side and a portion of the right hand end of the blank. The other three infolders will move in the same direction simultaneously; and therefore the adjustment shown is one wherein all the edges of the blank will be infolded in one operation through diagonal movements of the infolders. When the movement of the disks is reversed, the infolders move outwardly again, the pressing operation having, however, in the meanwhile taken place. The many other adjustments to which the above described infolder actuating mechanism is susceptible need hardly be further described, as many of them will be obvious from the above description.

*Infolder lifting mechanism.*—By lifting up the disks L, L', slightly, the infolders can be elevated so as to pass smoothly over the templet and blank edges on their inward movement. Fig. 7 shows the disks to be liftable, and as they support the infolders the entire infolding system can be elevated simultaneously.

A disk lifter N, Fig. 1, is in the form of a cam lever, its pivot at n, its portion bearing upward against disk L' at n', and its cam surface at n². A short longitudinal horizontal shaft N' oscillating in fixed bearings, has a lifting toe n³ directly beneath the cam surface n², Fig. 1, and, at its outer end an arm n⁴, Figs. 2, 6, whose extremity, provided with a roller, constituted to roll upon a cam N² which turns with main shaft B. The cam N² has eccentric portions as seen in dotted lines in Fig. 1, which act as follows. Shaft B rotates opposite to the hands of a watch. As it so rotates, the eccentricity of cam N² first causes a very slight pushing out of arm n⁴ and lifting of the disks and infolders. This lifting is extremely slight and just sufficient to prevent the infolders and the templet edges between them cutting the cloth of the blanks. It therefore is made to occur just at the stage where the infolders are passing over the edges of the templet and inturning or infolding the edges of the blanks. The cam N² will be seen to then have a slightly further elevated portion immediately succeeding that just described. This effects a similarly slight elevation of the infolders entirely insufficient to lift the same off the blanks, but sufficient merely to reduce the pressure between the infolders and the blanks so as to facilitate the contraction or collapsing of the templet and the removal of the blades of the latter from the folds of the blanks. Were it not for this relief in pressure the withdrawal of the templet edges, especially if the same were not perfectly smooth and bright, might cause a minute distortion or displacement of the material of the blanks, which would be extremely detrimental to the quality of the product. The templet being collapsed, there no longer exists a need of having the infolders elevated, and the next motion of the cam N² and the disk lifter is a dropping to original position, allowing an intimate contact between the infolders and the blanks, at which stage the parts are in position for the application of a squeezing pressure to fix and press the folds between the infolders and the bed.

*Pressure apparatus.*—This is for creasing by squeezing the folds of the blanks after their formation. A relative movement between the bed and infolders for this purpose is produced by depressing the latter with a powerful pressure toward the former. A convenient means to accomplish this consists of a series of presser heads, six being shown, at O, Figs. 2 and 6, in top view, and Figs. 3, 4 and 7 in elevation, each consisting of a flat disk-like piece of metal located above and normally resting loosely on top of the infolders at various points. Each presser head has its downwardly extending stem O', which passes through a hole in the infolder, see dotted lines Fig. 6, sufficiently large that the infolder movements will not be interfered with by said stems. The stems O' pass to where downward pull can be applied to them to depress the infolders.

$O^2$, Figs. 4 and 5, indicates a horizontal plate through which all six of the stems O' pass and below which the latter are headed at $o$ by nuts. The plate $O^2$ when pulled downwardly, exerts pressure on all of the stems, presser heads and infolders. To accomplish this, the plate $O^2$ is provided with a downwardly extending hanger $O^3$, Fig. 4, or preferably two such hangers. Each of the hangers $O^3$ is acted upon by a power lever of a peculiar form and nature. Each of the power levers has a shaft portion $O^4$ running forwardly and backwardly, oscillating in fixed bearings at its front and rear ends. Near its front end is fixed an arm $o'$, which projects downwardly and curves forwardly to a point $o^2$ where it is provided with a roller engaging a dwell of a presser cam $O^5$. The two presser cams $O^5$ and the arms $o^2$ are also seen in the front view, Fig. 3, and they will be seen to be symmetrically placed. The presser cams, being upon the main driving shaft B, are continuously rotated when the machine is in operation. They have eccentric portions correspondingly and therefore oppositely arranged so that the two arms $o^2$ will move toward each other at one stage and away from each other at another stage of the operation. This swinging movement of the arms $o^2$ will cause a slight oscillation (see Fig. 5) of the two shafts $O^4$.

Each of the oscillating shafts $O^4$ has a horizontal projection $o^3$ near its central portion. The two projections $o^3$ extend toward each other, and therefore each of them extends toward the center of the machine, as will be clear from Fig. 4, or from the dotted lines Fig. 5. These projections $o^3$ are very heavy and capable of exerting a powerful pressure when the shafts $O^4$ are oscillated. Each of the projections $o^3$ passes between one of the hangers $O^3$ and the horizontal plate $O^2$ in such a way as to bear downwardly upon the hangers $O^3$. The said hangers are provided with small nubs $o^4$ at their central portion, which may be screw threaded and thereby vertically adjusted so as to equalize the pressure upon the two hangers, and against which nubs $o^4$ the projections $o^3$ directly bear. After the folding has been accomplished and the templet collapsed, the presser heads are then brought into play through the cam portions of cams $O^5$ coming into action. These oscillate the arms $o^2$, shafts $O^4$ and projections $o^3$, the latter bearing down on the nubs $o^4$ of the hangers $O^3$, which under this influence pull downward the plates $O^2$, thereby depressing the presser stems, presser heads and infolders to crease the blanks.

*The table.*—This improved device affords a convenient rest for the operator's arms when necessary to handle blanks, or for blanks. It comprises a horizontally arranged plate P, Figs. 1, 2, 3, extending forwardly at the upper front of the machine. It is approximately in alinement with the wings H, and therefore facilitates the manual transfer of unfolded blanks from the table to the wings and their accurate placing on the latter. Beneath the table, normally, are various parts of the blank handling apparatus hereinafter to be described, and thereby the table affords a protection to such apparatus, to the blanks which it handles, and to the operator's hands and clothing, precluding their becoming enmeshed in the machinery. When, however, the operator desires to inspect or attend to the blank handling machinery beneath the table, or to remove the folded blanks which have gathered there, he may swing or tilt the table upwardly into a vertical position where it will be out of the way. To effect this important result I provide the table with a couple of swinging brackets $p$ pivoted to a fixed part of the machine frame at $p'$ and having on a downwardly projecting portion thereof a lug or stop $p^2$, Figs. 1 and 3, which, when the table is in normal or horizontal position, abuts against a fixed part of the frame and maintains the table steady.

*Out-feeding mechanism.*—I have described how the blank, after folding and pressing, is lifted by the blank lifter I somewhat above the bed, as seen in Fig. 4, to a position intermediate the bed and the wings. In this position the blank and lifter will not interfere with the operator inserting new blanks on the wings for the next operation, and thus a considerable economy in time is effected. In this intermediate position of the blank lifter, the out-feeding mechanism comes into play, it grasping and drawing out laterally, between the bed and wings, the folded blanks. To assist the proper grasping of the folded blanks, the blank lifter I (see Figs. 2 and 4) is cut away at $i^7$.

The out-feeding mechanism comprises, as a part of it, an instrumentality for directly grasping and withdrawing the folded blanks, namely, the tongs Q, Q′, consisting of the upper portion Q and the lower portion Q′, between which the folded blanks may be held; and these tongs are located opposite so as to grasp the portion of the folded blanks above the cut-away area $i^7$ of the blank lifter. Fig. 4 shows the tongs in a position about to grasp the folded blanks preparatory to drawing them outwardly between the bed and the wings. The out-feeding tongs are capable of a considerable inward and outward movement, from their blank grasping position to an outward or forward position, whereat the blanks may be deposited in a receptacle. For the purpose of these movements a swinging arm $Q^2$ is provided, or two of them, Fig. 4 showing their inward position, and Fig. 1 their forward position. The arms $Q^2$ are mounted on a horizontal and lengthwise arranged axle $C^3$ through two hubs $q$ turning loosely upon the axle $C^3$ and held against lateral movement by collars $q'$, $q'$, secured upon the axle $C^3$. The arms $Q^2$, $Q^2$, carry not only the tongs Q, Q′, but also mechanism for opening and closing the latter at the proper points of time in the operation of the machine.

Extending between the upper ends of the arms $Q^2$, $Q^2$, is a hollow shaft $Q^3$ within which is a rotatable rod $Q^4$. The hollow shaft $Q^3$ directly carries the weight of the tongs Q, Q′. Shaft $Q^3$ is capable of slight rotation to change the tongs from a normal position to a slightly elevated position. In the normal position the pin $q^2$ on the shaft $Q^3$ rests upon a stop $q^3$ rigid with the left hand of the arms $Q^2$. The movement of elevating it is against gravity and also against the force of a coil spring $q^4$, which is under tension and tends to maintain the shaft $Q^3$ in normal position. To afford a delicate adjustment of the tension of spring $q^4$, there is provided a piece $q^5$ fast on the shaft $Q^3$ and which has a series of nicks or slots, into any of which at will the end of the coil spring $q^4$ may be engaged. About the center of shaft $Q^3$ is an enlargement or collar $q^6$, with which is formed a casting $q^7$ extending rearwardly or away from the operator. To the casting $q^7$ is rigidly secured one of the portions Q′ of the tongs, and the other portion Q is pivotally secured to said casting $q^7$ by a pivot located at $q^8$. The tong portions Q, Q′, being extremely light and springy, the upper one is secured to a small casting $q^9$, which is the part that is actually pivoted at $q^8$. The casting $q^9$ extends forwardly beyond the pivot $q^8$ (see Figs. 1 and 2), and at $q^{10}$ is provided with a pin or roller through which oscillations of the casting $q^9$ and the upper tong portion may be effected. The tiny helical spring, seen at $q^{11}$, Fig. 3, and in dotted lines, Fig. 4, is so connected with the forwardly extending portion of the casting $q^9$ as to pull the same downwardly and thereby normally maintain the upper tong portion in an elevated position as in Fig. 4. In other words, the tongs are normally kept open.

The mechanism for closing the tongs at the proper moment will now be described. This closing is supposed to take place when the parts are in the position shown in Fig. 4. The upper tong portion comes downwardly, and the light fabric blank is clasped between the two tong portions and there held until after it has been laterally withdrawn.

As already stated, the interior of the hollow shaft $Q^3$ contains a rod $Q^4$, which extends from end to end, and has its bearings in the enlargements at the upper ends respectively of the swinging arms $Q^2$, $Q^2$. The right hand end of the rod $Q^4$ passes clear through the enlargement at that end, and secured to it is a short crank arm $q^{12}$, Figs. 2 and 5. Extending downwardly from the crank arm $q^{12}$ are connections for oscillating it, and thereby oscillating the interior rod $Q^4$. The said rod has secured near its middle an outwardly projecting pin $q^{13}$, to allow the play of which an aperture is cut in the hollow shaft $Q^3$. This pin $q^{13}$, as well seen in Figs. 1 and 5, rests directly beneath the roller $q^{10}$ of the casting $q^9$ which carries the upper tong portion Q. The oscillation of the interior rod $Q^4$ through the pin $q^{13}$ effects the lowering of the tong portion Q to close the tongs against the resistance of the helical spring $q^{11}$, and thereby grasp the blank.

The backward and forward swinging of the long arms $Q^2$, which carry the mechanism described above in this chapter, and the opening and closing of the tongs, are controlled and effectuated through the power shafts which operate the other instrumentalities of the machine, and in harmony with the other operations.

The means for opening and closing the tongs is best seen in Fig. 5. Extending downwardly from the crank arm $q^{12}$ is a link $q^{14}$ which in turn connects with a simple lever $q^{15}$ pivoted on the arm $Q^2$, and which beyond its fulcrum is pivoted to another link $q^{16}$ extending downwardly to where it in turn is pivoted to a second lever $q^{17}$, also pivoted to the arm $Q^2$ and extending rearwardly beyond its connection with link $q^{16}$ to where it is provided with a roller $q^{18}$ that runs along the arc-shaped upper surface $q^{19}$ of a cam lever or arc lever $Q^5$. The last named cam lever is journaled loosely upon the fixed axle C at the rear of the machine, and at an intermediate point it has a pin and roller $q^{20}$ upon the peripheral surface $q^{21}$ of a portion of the same cam $O^5$ which was above described as causing the actuation of the presser mechanism, and the same being fast upon the main driving shaft B. It will be seen that a rotation of said shaft, when it brings eccentric portions of cam surface $q^{21}$ beneath the roller $q^{20}$, will cause the cam lever $Q^5$ to rise or to fall by gravity, depending upon how the said cam surfaces are timed. When raised, the cam lever $Q^5$ will raise the lever $q^{17}$ and link $q^{16}$, thereby lowering the link $q^{14}$ and the crank arm $q^{12}$, thereby in turn raising the pin $q^{13}$ upon the interior rod $Q^4$, and, as explained, in this way closing the tongs so as to grasp the folded blank.

In Fig. 5 the parts are shown in the same position as in Fig. 4, the tongs open and about to grasp the blank. The roller $q^{20}$ on the cam lever $Q^5$ is about to ride up on a concentric portion of cam surface $q^{21}$ to a higher portion of the latter; this effecting the closing of the tongs, which are retained closed during the further operation of the machine, until the succeeding eccentric portion of cam $q^{12}$ comes beneath the roller, when the latter will drop, opening the tongs and releasing the blank, which may fall into a receptacle arranged for that purpose. Thereafter the roller will again immediately rise to a higher point than before, thus causing the pin $q^{13}$ not only to close the tongs, but to move farther so that, bearing upward against the roller $q^{10}$, it will actually raise the tongs and the casting $q^7$ against the resistance of the helical spring $q^4$ to a point above the normal, where the same will remain until nearly a half cycle of the machine's operation, when other eccentric portions of cam $q^{21}$ again cause the tongs first to drop to normal position and then to open preparatory to seizing a new blank. The arc-shaped portion $q^{19}$ of cam lever $Q^5$ at its forward end is the form of a circle whose center is the axle $C^3$, upon which the arms $Q^2$ oscillate, and this being the case, the oscillating movements to said arms $Q^2$ are precluded from causing any movements of parts $q^5$ to $q^{18}$. Only the movements of cam lever $Q^5$ will actuate the latter. The swinging of the arms $Q^2$ will now be described. As stated, they are loosely pivoted on the non-rotating axle $C^3$ about midway of the height of the machine. The hubs by which these arms are connected to axle $C^3$ are connected with each other by a longitudinal web $q^{22}$, Figs. 3 and 4, with which is formed a rearwardly projecting lug $q^{23}$ nearly midway between the arms $Q^2$.

This lug, best seen in Fig. 4, has a pin $q^{24}$ and block $q^{25}$ connection with a heavy cam lever $Q^6$ through a slot at $q^{26}$ in the forward end of the latter, its rearward end being fulcrumed loosely upon the fixed axle $C^2$. At an intermediate point of the cam lever $Q^6$ is a pin and roller $q^{27}$, seen in dotted lines in Figs. 3 and 4, which projects toward the right from said cam lever and enters into a dwell in the face of the cam $I^5$, which turns with the main power shaft B. The cam $I^5$ has already been mentioned as controlling the movements of the blank lifter. In fact, it has three different cam portions and effects three functions, rather than providing three different cams to do so. The actuation of blank lifter takes effect on the right hand side or face of cam $I^5$, where there is a dwell or groove near the periphery. On the same face, but nearer the center, is another dwell $R^6$ whose function will hereinafter appear. On its left hand face or side is the dwell which engages the roller $q^{27}$ to effect the oscillating movements of the arms $Q^2$, $Q^2$. This dwell $Q^7$ may be seen in dotted lines in Fig. 4 as engaged by the roller $q^{27}$. It has concentric portions and other portions which are eccentric and so arranged as to move the arms $Q^2$ inwardly in time for the tongs Q, Q' to grasp the folded blank, and thereafter move the same outwardly to the full extent, then inwardly in a gradual manner to a slight extent only, during which the depositing of the blanks in the receptacle takes place, and then inwardly again to the blank grasping position.

*Receptacle for folded blanks.*—This is an automatic mechanism, which not only receives, but places the folded blanks in orderly juxtaposition, moreover compressing them there so as to assist maintaining the folds intact, and packing them together in a convenient way to be tied together, after a desired number are folded, into a bundle, that can be carried to the stitching department for the subsequent operations in the making of a complete cuff, collar or shirt bosom. The general idea is that the outfeeding mechanism should successively drop the blanks vertically into one portion of the receptacle, there being devices for placing it into a restricted portion with those already received. Figs. 1, 2, 3 and 4 best show the construction. The foundation is the almost horizontal part R forming the floor of the receptacle, and which, at $r$, is fixed rigidly to the machine frame. R' is the receptacle front wall, behind which the blanks are packed. It is movable forwardly as the receptacle enlarges with its acquisitions of blanks. It is carried on a long rod $R^2$, made of a curved form to clear various other mechanisms, and pivoted at $r'$ to a special longitudinal shaft $r^2$, which in turn is provided with another rod $r^3$ having a heavy weight $R^3$ thereon, by which gravity is made to hold the receptacle wall $R'$ pressed rearwardly against the blanks in a yielding way, and permitting its enlargement, as before explained. The receptacle also has a rear wall $R^4$ which vibrates regularly during the operation of the machine. It is held in a substantially vertical position through an angle iron $r^4$ at its base, which connects it to a slide $r^5$, best seen in cross section in Fig. 4. The slide $r^5$ vibrates forwardly and backwardly in a slot formed at $r^6$ in the floor R. The rod $R^2$, which carries the receptacle front wall, it should be stated, passes through a similar but longer slot $r^7$ in the floor. For effecting vibrations of the receptacle rear wall the following connections are made with the power mechanism of the machine. Fig. 4 best shows them. A link $r^8$ is pivotally connected at front with a downward projection on the slide $r^5$, and at its rear is pivotally connected with the upper end $r^9$ of a bell crank lever $R^5$ loosely journaled upon the fixed axle $C^2$, whose other arm $r^{10}$ extends in a forward direction to its extremity provided with a roller $r^{11}$ that engages in the groove or dwell $R^6$ on the right hand side of the cam $I^5$ already mentioned, which rotates with the main power shaft B. The eccentric portions of the cam slot $R^6$ are such as to draw the rear wall of the receptacle rearwardly previously to the depositing therein by the out-feeding mechanism of a folded blank. Thereafter the rear wall will be moved forwardly so as to crowd the folded blank up against the folded blanks which have already been received in the receptacle. Another device then comes into play to secure the blank in this position while the rear wall $R^4$ moves backwardly to its original position preparatory to receiving a new blank; and this backward and forward vibration is maintained continuously during the operation of the machine.

For holding together in a condensed form and pressed against each other the blanks which have been received in the receptacle and pressed forwardly therein by the rear wall, I have employed an instrumentality comprising preferably a pair of devices which I refer to as disappearing fingers, or blank packing fingers $R^7$, best seen in Figs. 1 and 2. These are adapted to bear against the end portions of the blanks rather than the middle, the middle being pressed against by the vibrating rear wall. The disappearing fingers are fitted to receive an upward and downward movement, and when moved downwardly, pass entirely out of the receptacle through slots formed in the bottom thereof at $r^{12}$. Figs. 1 and 4 best show the means by which this is accomplished. The fingers $R^7$ move upwardly and downwardly in sliding contact with their bracket $r^{13}$, which is fast on the receptacle floor R and projects downwardly at substantially right angles with the floor R. The sliding connection between the fingers $R^7$ and the bracket $r^{13}$ may be through a groove in the latter. For actuating the fingers a cam lever $R^8$, whose contour may be best traced in Fig. 4, is employed. It extends rearwardly and curves with an upward sweep, then rearwardly in a downwardly inclined direction to where, at $r^{14}$, it is pivoted to a fixed part of the machine; continuing rearwardly to where, at $r^{15}$, its extremity is provided with a pin or roller intended to engage in a cam groove $R^9$ formed in the right hand face of the large gear $c$ already mentioned, which latter is fast upon and revolves continuously with the auxiliary shaft C. The cam groove $R^9$ is mostly concentric, but has eccentric portions, commencing at $r^{16}$, which by elevating the rear extremity of the cam lever $R^8$, depresses its forward extremity, which is pivotally connected to the disappearing fingers, thereby lowering the fingers. The fingers rise again when another eccentric portion of cam $R^9$ comes into play.

In order that the folded blanks being gathered in the receptacle will not slide forward and backward in contact with the floor R, I employ a couple of supporting wires $R^{10}$, which are secured to the movable front wall of the receptacle and extend rearwardly beyond the rear wall $R^4$. When the folded blank is dropped into the receptacle it rests upon the wires $R^{10}$ which move with the front wall, as explained, and thereby prevent abrasion of the blanks.

*Operation.*—I will now describe the preferred order of operation of the machine hereof.

The series of steps constituting the operation may be divided into three parts, owing to the fact that when properly timed, the machine may operate upon three blanks simultaneously, the several blanks, however, being at different stages of operation. A preliminary step is the pressing downwardly of the forward end of the treadle, which throws the power belt upon the fast pulley and sets the machine in operation; and, when smoothly running, throwing the latch $D^4$ so as to prevent the automatic stopping action, which would otherwise occur at the end of each cycle of movements. Starting with the first blank consisting of one or more layers of fabric, these the operator will have in his hands or resting upon the table in the front of the machine. The templet being elevated, the wings are easily accessible, and the operator transfers the blanks from the table to the wings, accurately positioning them with respect to the gages on the wings. Having done this, the operator prepares to get the next blank ready for insertion. In the meanwhile, through the harmonious arrangement of the several power actuated cams, the following operations take place. The templet comes downwardly in its expanded condition, it being small enough to pass through the aperture in the wings. The unfolded blank lying on the wings being in the proper plane, is met by the templet from above and by the elastically supported lifter from below. The templet and the lifter then take charge of the blank, and the continuing down movement of the templet carries the blank through the aperture in the wings, releasing it from the wings and carrying it onward until it reaches the steam heated bed. The blank lifter fits into the recess in the bed while the templet presses and holds the unfolded blank downwardly for a brief period. During this period the infolders are operated to rise slightly and move inwardly so as to carry the edge portions of the blanks over the edge portions of the templet, thus producing the desired folds. When the infolders have reached their inward position, they are slightly raised just sufficiently to allow the templet to be collapsed. The templet is then collapsed, and thereafter elevated to its highest position, in the meanwhile the pressure mechanism coming into play to squeeze the folds of the blanks between the infolders and the heated bed.

The full value of the operation permitted by the present invention will now be seen. The second portion of the operation on the first blank now commences, while, the templet being raised, the second blank can be made to begin its operations, since the operator may at once place it upon the wings preparatory to a repetition of the cycle which has already been performed on the first blank. The second set of operations upon the first blank are in the meanwhile going on. The presser heads are first released, permitting the infolders to be moved outwardly. The blank lifter is then elevated slightly so as to raise the blank above the bed to a point between the bed and the wings where it will not interfere with the placing of a new blank upon the wings, but where it may be engaged by the out-feeding mechanism. The open tongs of the out-feeding mechanism now come into the position seen in Fig. 4. The tongs are then closed, the spring portions thereof lightly grasping the folded blank by its forward edge. The out-feeding mechanism then operates to draw the tongs and the folded blank outwardly to the position of Fig. 1. During this outward movement the blank lifter, being now free of the folded blank, is again elevated to the plane of the wings, where it arrives in time to coöperate with the templet for the carrying of the second blank from the wings to the bed. At this stage a third blank is being prepared by the operator to insert upon the wings. The second blank is about to be carried downwardly to the bed to be folded and pressed. The first blank enters its third set of operations. The out-feeding tongs, with a slight lateral movement and opening at the same time, drop the first blank into the receptacle forward of the sliding rear wall and rearward of the disappearing fingers. The tongs then are raised and start backward toward the bed for grasping the second blank. In the meanwhile the vibrating rear wall of the receptacle moves forward carrying the blank into contact with the movable front wall or in contact with such folded blanks as have already been placed in the receptacle. The fingers then drop out of the receptacle or "disappear;" and upon rising again to their original position are now behind the folded blank, the latter being confined between the fingers and the front wall. The rear wall then returns to its rearward or normal position, and the receptacle is ready to receive a second blank. While the first blank is thus being put in place in the receptacle, the second blank may be undergoing its pressing operation, and the third blank may have been laid upon the wings. When forty-eight blanks, for example, have been folded and placed in the receptacle, this number constituting a commercial dozen sufficient for a dozen pairs of cuffs, the operator may open the lock which keeps the machine in continuous operation, and the mechanisms will come to a stop. The blanks may be counted by the operator or automatically. The machine may, as explained, be stopped at any point in the operation, as in the case of breakage. The operator, having stopped the machine, lifts up the front table and ties the blanks together with tape into a bundle which he lays aside and proceeds again to fold another bundle. The bundles of folded blanks will be carried off at suitable intervals to the stitching department of the factory.

A speed of one turn of the main shaft in three seconds will produce 12,000 blanks, or 250 commercial dozen per day of ten hours, but by doubling the speed with proper skill of operation, 500 commercial dozen can be folded per day on a single machine. Practically speaking, the only limitation is in the operator's ability to insert the blank and lining together accurately between the gages of the wings; an automatic mechanism for accomplishing this would still further increase the efficiency of the machine.

What I claim and desire to secure by Letters Patent is set forth in the following claims:

1. In a folding machine, a main shaft and a power controller having a neutral position and movable in one direction therefrom to start the machine, means whereby when started the machine continues automatically to the end of one cycle and then automatically stops, and said controller movable in another direction from neutral for instantaneously stopping the machine before the end of a cycle; combined with blank-infolding mechanism actuated from the main shaft.

2. In a folding machine, a main shaft and a power controller having a neutral position and movable in one direction therefrom to start the machine, means whereby when started the machine continues automatically to the end of one cycle and then automatically stops, and said controller movable in another direction for instantaneously stopping the machine before the end of a cycle, and means for holding said controller in operative position whereby the machine will run continuously without stopping at cycle ends; combined with blank-infolding mechanism actuated from the main shaft.

3. In a folding machine, a controller which may be shifted out of normal, means for setting the main shaft in revolution when said controller is so shifted, said means adapted to maintain the shaft in revolution until the end of a cycle of movement and then cause it to stop, and a part for maintaining said controller out of normal whereby the machine may operate for cycle after cycle without stoppage; combined with blank-infolding mechanism actuated from the main shaft.

4. In a folding machine, fast and loose pulleys, a main shaft, a spring, a power controller adapted to effect the shifting of a power belt from the loose to fast pulley against the resistance of said spring, a part set in movement by said main shaft and adapted to maintain the belt on the fast pulley after said controller is released, and a second and stronger spring interposed in the belt shifting mechanism, whereby on reversing the position of said controller said stronger spring may be sprung, the belt shifted against said spring, and the machine stopped whenever desired; combined with blank-infolding mechanism actuated from the main shaft.

5. In a folding machine the combination of a templet, templet carrying arms, a bell crank lever as $g'$, $g^3$, adjustable connections between lever part $g'$ and said arms, and a power cam against which lever part $g^3$ bears by the weight of the templet, whereby said cam may raise said templet or the same may at will be lifted by hand.

6. In a folding machine the combination of a templet, a templet carrying arm, a rotating cam for lifting the same, a lever as $g'$, $g^3$, oscillated from said cam, and a link intermediate said lever and arm, said link being adjustable as to length.

7. In a folding machine the combination with a templet of a templet carrying arm or arms fast on a shaft, an arm G also fast thereon, a link as G' adjustable as to length, a lever connected by said link to said arm G, a roller on the opposite end of said lever, and an outside cam against which said roller bears by the weight of the templet.

8. In a folding machine, the combination of infolding mechanism and a bed whereon the blanks are infolded, wings permanently located above the infolding mechanism on which unfolded blanks may be positioned to be subsequently transferred to the bed, with a space between the wings and infolding mechanism by which the folded blanks may be laterally extricated, said wings located to embrace the path of movement of the hereinbelow recited transferring means, together with means for transferring the blanks from the wings to a predetermined position on the bed.

9. In a folding machine, the combination of infolding mechanism and a bed whereon the blanks are infolded, wings permanently located above the infolding mechanism on which unfolded blanks may be positioned to be subsequently transferred to the bed, with a space between the wings and infolding mechanism by which the folded blanks may be laterally extricated, said wings located to embrace the path of movement of the hereinbelow recited transferring means, together with means, including a blank-defining templet for transferring the blanks from the wings to a predetermined position on the bed.

10. In a folding machine, the combination of a platform on which unfolded blanks may be placed folding mechanism therebelow, with a space between said platform and folding mechanism by which the folded blanks may be laterally extricated; together with means for transferring blanks from the platform to the bed, said platform constructed to embrace the path of movement of the transferring means.

11. In a folding machine, the combination of folding mechanism, a platform spaced thereabove for receiving blanks to be folded, the same centrally apertured, a templet movable from above to below said platform through said aperture, and means for withdrawing the templet from the folds of a blank, whereby it may be elevated above the platform to permit the insertion of a new blank while the folded blank is extricated laterally between the platform and folding mechanism.

12. In a folding machine, the combination of a bed, infolders for folding blanks on said bed, a templet for defining the blanks during folding, a centrally apertured platform spaced above said infolders, means for collapsing said templet, means for raising the same through said aperture and above said platform, and means for pressing the folds of the blanks between the infolders and bed after the collapsing of said templet; all so constituted that the folded blank may be removed laterally through the space between said infolders and said platform and the succeeding blank inserted above said platform.

13. In a folding machine having templet, folding and pressing mechanism, an auxiliary blank supporting platform embracing the templet's path of movement and spaced above the infolding mechanism, and above which unfolded blanks are positioned and below which they are folded, pressed and between which and the infolding mechanism they are removed.

14. In a folding machine, the combination with a bed of means for carrying and moving a blank with relation to the bed, including a member as I, an axle as C', an irregular arm extending to axle C', a power actuated lever as I⁴, and connections between said arm and lever comprising a link and a spring thereon, its ends secured to one connection, its middle to another.

15. In a folding machine, the combination of a blank lifting or lowering member as I, a power actuated lever as I⁴, and connections therebetween comprising a link, a helical spring thereon, its ends secured to the same mechanical member, its middle to a different connection, and means for adjusting said spring lengthwise.

16. In a folding machine the combination of infolding mechanism and a bed whereon the blanks are infolded, wings permanently located above the infolding mechanism on which unfolded blanks may be positioned to be subsequently transferred to the bed, with a space between the wings and folding mechanism by which the folded blanks may be laterally extricated, said wings located to embrace the path of movement of the hereinbelow recited member; together with a member, as I, movable between the wings and bed beneath the blanks.

17. In a folding machine the combination of infolding mechanism and a bed whereon the blanks are infolded, wings permanently located above the infolding mechanism on which unfolded blanks may be positioned to be subsequently transferred to the bed, with a space between the wings and folding mechanism by which the folded blanks may be laterally extricated, said wings located to embrace the path of movement of the hereinbelow recited member; together with a member, as I, movable between the wings and bed beneath the blanks, and a templet movable through said wings with means for actuating it to press the descending blanks against said member.

18. In a folding machine, the combination with a templet and folding mechanism, of a platform above the latter constructed and located to embrace the templet path of movement and on which platform unfolded blanks may be inserted, with a space between said folding mechanism and said platform by which the folded blanks may be extricated laterally, and a blank lifter for lifting the folded blanks sufficiently to be so extricated.

19. In a folding machine, the combination with a templet and folding mechanism, of a platform above the latter constructed and located to embrace the templet path of movement and on which platform unfolded blanks may be inserted, with a space between said folding mechanism and said platform by which the folded blanks may be extricated laterally, and a blank lifter for lifting the folded blanks sufficiently to be so extricated, said blank lifter serving also, after the extrication of the folded blank, to rise to the plane of said platform and operate in harmony with the templet for carrying the subsequent blank to the infolding mechanism.

20. In a folding machine, the combination of a blank receiving platform centrally apertured, a templet movable through said aperture, infolding mechanism, said platform located above said folding mechanism with a space between the two out of which a folded blank may be removed, and a member movable across the space between the platform and infolding mechanism; said member being adjustable to each of three positions, the lower position being folding position, the upper one blank receiving position, and the intermediate one blank extracting position.

21. In a folding machine, the combination of a blank receiving platform centrally apertured, a templet movable through said aperture, infolding mechanism, said platform located above said folding mechanism with a space between the two out of which a folded blank may be removed, and a member movable across the space between the platform and infolding mechanism; said member adapted to coöperate with the templet to hold the blanks while descending from platform to bed, and the templet adapted to rise after folding and leave the folded blank on said member.

22. In a folding machine, the combination of folding mechanism, a platform for receiving blanks to be folded, the same centrally apertured, said platform located above said folding mechanism with a space between the two out of which a folded blank may be removed, a templet movable from above to below said platform through said aperture, means for withdrawing the templet from the folds of a blank, whereby it may be elevated above the platform to permit the insertion of a new blank while the folded blank is extricated laterally between the platform and folding mechanism; and a blank lifter for lifting the completed blanks to assist their aforesaid extrication.

23. In a folding machine, the combination of folding mechanism, a platform for receiving blanks to be folded, the same centrally apertured, said platform located above said folding mechanism with a space between the two out of which a folded blank may be removed, a templet movable from above to below said platform through said aperture, means for withdrawing the templet from the folds of a blank, whereby it may be elevated above the platform to permit the insertion of a new blank while the folded blank is extricated laterally between the platform and folding mechanism; and a blank lifter for lifting the completed blanks to assist their aforesaid extrication, and for subsequently rising to the platform to coöperate with the templet in transferring the new blank therefrom to the fold producing mechanism.

24. In a folding machine, the combination of folding mechanism, a platform for receiving blanks to be folded, the same centrally apertured, said platform located above said folding mechanism with a space between the two out of which a folded blank may be removed, a templet movable from above to below said platform through said aperture, means for withdrawing the templet from the folds of a blank, whereby it may be elevated above the platform to permit the insertion of a new blank while the folded blank is extricated laterally between the platform and folding mechanism, means for pressing the folded blanks in the place where folded after the withdrawal of the templet from the folds; and a blank lifter for lifting the completed blanks to assist their aforesaid extrication, and for subsequently rising to the platform to coöperate with the templet in transferring the new blank therefrom to the fold producing mechanism.

25. In a folding machine, an infolder combined with a disk beneath it, a plurality of connections between the infolder and disk comprising slots arranged at different angles and pins engaging them, and means for oscillating said disk.

26. In a folding machine, the combination of a set of infolders, and actuating mechanism therefor comprising an upper disk beneath two or more infolders, a lower disk, mechanism for oscillating said disks, and connections extending from infolders downwardly to both disks whereby both may actuate said infolders.

27. In a folding machine, the combination of a set of infolders, an actuating disk beneath the infolders at one end of the machine, a lower disk beneath said disk, a similar pair of disks at the other end connected to rotate with the first pair, connections extending from infolders downward to both upper and lower disks, and means for oscillating said disks for causing inward and outward movements of infolders.

28. In a folding machine, the combination of a set of infolders and actuating mechanism therefor comprising an upper disk, a lower disk, connections extending from an infolder downward to both disks comprising slots at different angles and pins engaging them, and means for oscillating the two disks for causing inward and outward movements of said infolder.

29. In a folding machine, the combination of a set of infolders and actuating mechanism therefor comprising an upper disk, a lower disk, connections extending from an infolder downward to both disks comprising slots at different angles and pins engaging them, and means for oscillating the two disks for causing inward and outward movements of said infolder; the upper disk cut away to permit connections with the lower disk.

30. In a folding machine, the combination of a set of infolders, and actuating mechanism therefor, comprising an upper disk beneath two infolders, a lower disk therebeneath, each of said infolders having two slot and pin connections extending to one or the other of said disks, the upper disk cut away to permit connection with the lower; and means for oscillating the disks whereby to effect inward and outward movements of the infolders.

31. In a folding machine, the combination of a set of infolders, and actuating mechanism therefor, comprising an upper disk beneath every pair of infolders, a lower disk therebeneath, each of said infolders having two slot and pin connections arranged at different angles and extending to one or the other of said disks, the upper disk cut away to permit connection with the lower; and means for oscillating the disks whereby to effect inward and outward movements of the infolders.

32. In a folding machine, the combination of a set of infolders, and actuating mechanism therefor, comprising an upper disk beneath two infolders, a lower disk therebeneath, each of said infolders having two slot and pin connections with one crosswise and one lengthwise slot and the pins engaging therein extending to one or the other of said disks, the upper disk cut away to permit connection with the lower; and means for oscillating the disks whereby to effect inward and outward movements of the infolders.

33. In a folding machine, the combination of a set of infolders, and actuating mechanism therefor, comprising a pair of superimposed members circularly movable about vertical axes, means for oppositely moving the same, and connections from both members to the infolders for transmitting motion to the latter.

34. In a folding machine, the combination of a set of infolders, a pair of superimposed disks, means for oppositely oscillating the two disks, infolder connections to the upper disk, and other infolder connections extending through cut-away portions of the upper disk to the lower disk.

35. In a folding machine, the combination of a set of infolders, and at each end of the machine a pair of superimposed oscillating disks, adjustable infolder connections for connecting either the upper or lower disks with infolders, and means for reversely oscillating the disks at one end in unison with those at the other.

36. In a folding machine, the combination of a set of infolders, actuating disks beneath the same, lower disks beneath said disks, connections from each infolder to an upper or a lower disk, all the lower disks connected to oscillate in unison, a rotating cam $L^3$, a lever $L^2$ for transmitting oscillation from said cam to said lower disks, a similar cam $L^5$ and connections for the upper disks and means for relatively adjusting the cams $L^3$, $L^5$ on their driving shaft.

37. In a folding machine, the combination of a set of infolders, and actuating mechanism therefor, comprising an upper disk beneath every pair of infolders, a lower disk therebeneath, each of said infolders having a plurality of adjustable slot and pin connections arranged at different angles and extending to one or the other of said disks, the upper disk cut away to permit connection with the lower; and means for oscillating the disks whereby to effect inward and outward movements of the infolders.

38. In a folding machine, the combination of a templet, a set of infolders, mechanism for causing inward and outward movements thereof, comprising actuating disks beneath said infolders, and disk lifters, whereby the disks may be lifted and thereby the infolders made to rise prior to their operative inward movement.

39. In a folding machine, the combination of a bed, a templet, a set of infolders, mechanism for causing inward and outward movements thereof comprising actuating disks beneath said infolders, disk lifters, and means for actuating said disk lifters whereby said infolders will rise sufficiently to pass smoothly over the templet during their operative inward movement.

40. In a folding machine, the combination of a bed, a templet, a set of infolders, mechanism for causing inward and outward movements thereof comprising actuating disks beneath said infolders, disk lifters, means for actuating said disk lifters whereby said infolders will rise sufficiently to pass smoothly over the templet during their operative inward movement, and a driving part as B with connections for operating the said mechanism and said disk lifters in harmony.

41. In a folding machine, the combination of a bed, infolding mechanism, blank receiving wings as H above the infolding mechanism, an upwardly swinging table in the upper front of the machine arranged to be normally substantially in alinement with said wings for the purpose set forth, and means for removing folded blanks beneath said wings and said table.

42. In a folding machine the combination of a bed, infolding mechanism, blank receiving wings above the infolding mechanism located to embrace the path of movement of the hereinbelow recited transferring means, a table in the upper front of the machine arranged in substantial alinement with said wings for the purpose set forth, means for transferring blanks from said wings to the bed, and means for removing folded blanks beneath said wings and said table.

43. In a folding machine, the combination of a bed, infolding mechanism, blank receiving wings above the infolding mechanism, an upwardly swinging table in the upper front of the machine arranged in substantial alinement with said wings for the purpose set forth, means for removing folded blanks beneath said wings, and a receptacle beneath said table for receiving such folded blanks.

44. In a folding machine, the combination of folding mechanism with outfeeding mechanism comprising grasping tongs, opening and closing devices therefor, swinging arms carrying said tongs and devices whereby the same may be moved from blank grasping position to an outward blank releasing position, and an arc lever whose arc coöperates with said opening and closing devices in any position of said arms, for operating said devices.

45. In a folding machine, the combination of folding mechanism with outfeeding mechanism comprising grasping tongs, opening and closing devices therefor, swinging arms carrying said tongs and devices whereby the same may be moved from blank grasping position to an outward blank releasing position, an arc lever whose arc coöperates with said opening and closing devices in any position of said arms, for operating them; and a part as B with connections for actuating said folding mechanism, said swinging arms and said arc lever in harmony with each other.

46. In a folding machine, the combination of folding mechanism, with outfeeding mechanism comprising blank grasping tongs, opening and closing devices, carriers carrying said tongs and devices, a cam lever whose cam surface is concentric with the carrier movements, connections on said carrier extending from said devices to said cam lever and making a cam engagement with the latter whereby lever movements will effect opening and closing of the tongs, and means for oscillating said lever in harmony with the carrier movements.

47. In a folding machine the combination of blank-folding mechanism for infolding the edges of fabric blanks for collars and like articles with outfeeding mechanism comprising a pair of blank grasping devices adapted to grasp and hold an infolded blank by its folded over edge, a reciprocating carrier therefor, an oscillating member on said carrier which bears the pair of grasping devices and having means for oscillating it to bodily raise and lower the pair of grasping devices, and a second oscillating member on said carrier for moving one grasping device relatively to the other.

48. In a folding machine the combination of blank-folding mechanism for infolding the edges of fabric blanks for collars or like articles with outfeeding mechanism comprising a pair of blank grasping devices, a reciprocating carrier therefor, two concentrically oscillating members on said carrier, the first for bearing said pair of grasping devices, the second co-acting with an extension on one grasping device for closing the grasping devices, and a spring opposing said second member, for keeping normally open the grasping devices.

49. In a folding machine the combination of blank-folding mechanism for infolding the edges of fabric blanks for collars or like articles with outfeeding mechanism comprising a pair of blank grasping devices, a reciprocating carrier therefor, two concentrically oscillating members on said carrier, the first for bearing said pair of grasping devices, the second co-acting with an extension on one grasping device for causing relative movement between the grasping devices, means for actuating said first member for raising the pair of grasping devices and a spring opposing said raising means, tending to lower said grasping devices.

50. In a folding machine the combination of blank-folding mechanism for infolding the edges of fabric blanks for collars or like articles with outfeeding mechanism comprising a pair of blank grasping devices, a reciprocating carrier therefor, a hollow oscillating member as shaft $Q^3$ on said carrier which bears the grasping devices and serves for swinging them upwardly and downwardly, an oscillating member as rod $Q^4$ contained within the hollow of said shaft and having connections extending without said hollow shaft for causing relative movement between said grasping devices, and mechanism for actuating said carrier, shaft and rod.

51. In a folding machine the combination of blank-folding mechanism for infolding the edges of fabric blanks for collars or like articles with outfeeding mechanism comprising a pair of blank grasping devices, a reciprocating carrier therefor, two concentrically oscillating members on said carrier, the first for bearing said pair of grasping devices, the second co-acting with an extension on one grasping device for closing the grasping devices, a spring opposing said second member, for keeping normally open the grasping devices, and means for oscillating said second member for raising it to close said grasping devices and farther raising it to swing said pair of grasping devices about said first oscillating member.

52. In a folding machine, the combination of folding mechanism for infolding the edges of fabric blanks for collars or like articles with outfeeding mechanism comprising a reciprocating carrier, blank grasping fingers thereon, a shaft on said carrier to which one finger is secured, a second finger pivoted to the first, a rod controlling the movement of the second finger and means for rotating said rod and shaft.

53. In a folding machine, the combination of folding mechanism for infolding the edges of fabric blanks for collars or like articles with outfeeding mechanism comprising a reciprocating carrier, blank grasping fingers thereon, a shaft on said carrier to which one finger is secured, a second finger pivoted to the first, a rod controlling the movement of the second finger and means for rotating said rod and shaft whereby in inward position the fingers will close on a blank, and in outward position the fingers will swing downward and then open to permit the blank to drop.

54. In a folding machine, the combination of folding mechanism for infolding the edges of fabric blanks for collars or like articles with outfeeding mechanism comprising a reciprocating carrier, blank grasping fingers thereon, a shaft on said carrier to which one finger is secured, a second finger pivoted to the first, a rod controlling the movement of the second finger and means for rotating said rod and shaft whereby in inward position the fingers will close on a blank, and in outward position the fingers will swing downward and then open to permit the blank to drop, and a receptacle which receives the blanks vertically and packs them as received.

55. In a folding machine, the combination of folding mechanism for infolding the edges of fabric blanks for collars or like articles with outfeeding mechanism comprising a reciprocating carrier, blank grasping fingers thereon, a shaft on said carrier to which one finger is secured, a second finger pivoted to the first, a rod controlling the movement of the second finger and means for rotating said rod and shaft whereby in inward position the fingers will close on a blank, and in outward position the fingers will swing downward and then open to permit the blank to drop into a receptacle which receives the blanks vertically and packs them as received; and a part as B, with connections whereby the folding mechanism is operated, the folded blank is grasped and pulled outward, the fingers swing downward, then opened dropping the blank into the receptacle, after which the fingers rise and move inward while the receptacle packs the blank.

56. In a machine for folding blanks for cuffs or the like, the combination of a horizontal blank support, a templet for defining the blanks while being infolded, infolding mechanism for infolding the edge portions of blanks on said support and for thereafter disengaging the infolded blanks, outfeeding mechanism for engaging the folded blanks while in horizontal position and for transferring the blanks successively to the receptacle hereinafter recited and depositing them therein in vertical position, and a receptacle into which the blank is placed by said outfeeding mechanism, said receptacle comprising a blank packing portion adapted for packing together vertically in a restricted space the several folded blanks, a member for moving the successive blanks from where they are placed by said outfeeding mechanism to said packing portion and a device for maintaining the blanks under compression therein while said blank moving member recedes for receiving a new blank.

57. In a machine for folding blanks for cuffs or the like, the combination of a horizontal blank support, a templet for defining the blanks while being infolded, infolding and pressing mechanism for infolding the edge portions of blanks on said support for pressing the folds and for thereafter disengaging the infolded blanks, outfeeding mechanism for engaging the folded blanks while in horizontal position by grasping them at their folded-in edge portions, and for transferring the blanks successively to the receptacle hereinafter recited, and for releasing said blanks to deposit them in such receptacle in vertical position, and a receptacle into which the blank is placed by said outfeeding mechanism, said receptacle comprising a blank packing portion adapted for packing together vertically in a restricted space the several folded blanks, a member for moving the successive blanks from where they are placed by said outfeeding mechanism to said packing portion and a device for maintaining the blanks under compression therein while said blank moving member recedes for receiving a new blank.

58. In a machine for folding blanks for cuffs and the like, the combination of a horizontal blank support, a templet, and mechanism for infolding the edge portions of blanks while on said support and defined by said templet, and for thereafter disengaging the infolded blanks, blank outfeeding mechanism for engaging the infolded blanks while in horizontal position and for transferring the blanks successively to the receptacle hereinafter recited and depositing them therein in vertical position, and a receptacle into which the blank is placed by said outfeeding mechanism, said receptacle comprising a blank compressing or packing portion, a member or wall for moving the successive blanks to said packing portion and packing them together there, and means for maintaining the blanks under compression therein while said blank moving member recedes for receiving a new blank; together with actuating mechanism for operating the folding mechanism, the outfeeding mechanism, and the receptacle mechanism in harmony with each other.

59. In a folding machine, the combination of a horizontal blank support, a templet, and mechanism for infolding the edge portions of blanks while on said support and defined by said templet, and for thereafter disengaging the infolded blanks, outfeeding mechanism for engaging the infolded blanks while in horizontal position and for transferring the blanks successively to the receptacle hereinafter recited and depositing them therein in vertical position, and a receptacle into which blanks may be vertically dropped successively, a vertical wall against which the blanks are packed under pressure, a second wall which reciprocates toward and from said first wall, a holding device between which and the second wall the blanks are dropped and between which and the first wall the blanks are compressed, and means for moving said holding device after the reception of each blank so as to include such blank in the packing space.

60. In a folding machine, the combination of a horizontal blank support, a templet, and mechanism for infolding the edge portions of blanks while on said support and defined by said templet, and for thereafter disengaging the infolded blanks, outfeeding mechanism for engaging the infolded blanks while in horizontal position and for transferring the blanks successively to the receptacle hereinafter recited and depositing them therein in vertical position, and a receptacle into which blanks may be dropped successively, said receptacle having a first wall which resistingly recedes as the blanks increase in number, a pushing wall for transferring the blanks from where they enter the receptacle to the body of blanks pressed by the first wall, and a movable device for holding the body of blanks while the pushing wall recedes preparatory to receiving a succeeding blank.

61. In a folding machine, the combination of a horizontal blank support, a templet, and mechanism for infolding the edge portions of blanks while on said support and defined by said templet, and for thereafter disengaging the infolded blanks, outfeeding mechanism for engaging the infolded blanks while in horizontal position and for transferring the blanks successively to the receptacle hereinafter recited and depositing them therein in vertical position, and a receptacle into which blanks may be dropped successively, said receptacle having a vertical wall which resistingly recedes as the blanks increase in number, a pushing wall for transferring the blanks from where they enter the receptacle to the body of blanks pressed by the first wall, a reciprocating device for holding the body of blanks while the pushing wall recedes preparatory to receiving a succeeding blank; and means for so operating said device as to shift it from the outside of one blank to the outside of the succeeding blank while the latter is under the pressure of said pushing wall.

62. In a folding machine, the combination of infolding mechanism, wings spaced thereabove on which unfolded blanks may be inserted, means for transferring blanks from said rings to said infolding mechanism, said wings located to embrace the path of movement of said transferring means, and outfeeding mechanism for removing folded blanks through the space between said infolding mechanism and said wings.

63. In a folding machine, the combination of infolding mechanism, wings spaced thereabove on which unfolded blanks may be inserted, a blank lifter for lifting blanks after folding to a point between said mechanism and said wings, said wings located to embrace the path of movement of said lifter, and outfeeding mechanism for removing folded blanks through the space between said infolding mechanism and said wings.

64. In a folding machine, the combination of a bed, infolding mechanism, wings forming a platform higher than the bed with a space between the two, a blank lifter for lifting the folded blank to a point intermediate the bed and wings, said wings located to embrace the path of movement of said lifter, together with an outfeeding mechanism whose blank grasping portions come in between the bed and wings and draw the blank out laterally.

65. In a folding machine, the combination of a bed, infolders for folding blanks on said bed, a templet for defining the blanks during folding, a centrally apertured platform above said bed, means for collapsing said templet, means for raising the same through said aperture and above said platform, and means for pressing the folds of the blanks between the infolders and bed after the collapsing of said templet; all so constituted that the folded and pressed blank may be removed below said platform and the succeeding blank inserted above it; together with an outfeeding mechanism whose blank engaging portion comes in between the bed and platform and outfeeds the folded blank therebetween.

66. In a folding machine having templet, folding and pressing mechanism, an auxiliary blank supporting platform spaced above said folding mechanism, and above which unfolded blanks are positioned and below which they are folded and pressed, and between which and said folding mechanism they are removed, combined with outfeeding mechanism operating between said folding mechanism and said platform.

67. In a folding machine having templet, folding and pressing mechanism, an auxiliary blank supporting platform spaced above said folding mechanism, and above which unfolded blanks are positioned and below which they are folded and pressed, and between which and said folding mechanism they are removed, combined with outfeeding mechanism operating between said folding mechanism and said platform; and a part as B, with connections for effecting the operations of said templet, folding, pressing and outfeeding mechanisms, in harmony.

68. In a folding machine, the combination of a bed, infolders for folding blanks on said bed, a templet for defining the blanks during folding, a centrally apertured platform above said bed, means for collapsing said templet, means for raising the same through said aperture and above said platform, and means for pressing the folds of the blanks between the infolders and bed after the collapsing of said templet; all so constituted that the folded and pressed blank may be removed below said platform and the succeeding blank inserted above it; together with an outfeeding mechanism whose blank engaging portion comes in between the bed and platform and outfeeds the folded blank therebetween; and a part as B, having connections whereby it may operate the aforesaid mechanism as follows: lowering the templet to carry a blank from the platform to the bed and there defining its folded form, moving the infolders to infold blank edges, collapsing the templet, pressing the folds between infolders and bed, moving the infolders outwardly, and removing the folded and pressed blank laterally, the templet meanwhile having risen to permit the succeeding blank to be inserted on said platform.

69. In a folding machine, the combination with a templet and folding mechanism, of a platform above the latter on which unfolded blanks may be inserted, with a space between said folding mechanism and said platform by which the folded blanks may be extricated laterally, and a blank lifter for lifting the folded blanks sufficiently to be so extricated, said platform constructed and located to embrace the path of movement of said lifter; together with an outfeeding mechanism whose blank engaging portions operate beneath said platform.

70. In a folding machine, the combination with a templet and folding mechanism, of a platform above the latter on which unfolded blanks may be inserted, with a space between said folding mechanism and said platform by which the folded blanks may be extricated laterally, and a blank lifter for lifting the folded blanks sufficiently to be so extricated, said platform constructed and located to embrace the path of movement of said lifter; together with an outfeeding mechanism whose blank engaging portions operate beneath said platform; and a part as B, with connections for operating the said elements in harmony.

71. In a folding machine, the combination with a templet and folding mechanism, of a platform above the latter on which unfolded blanks may be inserted, with a space between said folding mechanism and said platform by which the folded blanks may be extricated laterally, and a blank lifter for lifting the folded blanks sufficiently to be so extricated, said platform constructed and located to embrace the path of movement of said lifter, said blank lifter serving also, after the extrication of the folded blank, to rise to the plane of said platform and operate in harmony with the templet for carrying the subsequent blank to the infolding mechanism; and a part as B, with connections for operating the said elements in harmony.

72. In a folding machine, the combination of a blank receiving platform centrally apertured, a templet movable through said aperture, infolding mechanism spaced therebelow, a member movable across the space between the platform and infolding mechanism; outfeeding mechanism having blank engaging devices which operate between the platform and infolding mechanism, a main actuating part, and mechanical connections therefrom to the several mechanisms, the same being timed so that after folding, the movable member rises to the level of said outfeeding devices and the templet rises above said platform, and after the extraction of the folded blank, the movable member rises to the level of said platform.

73. In a folding machine, the combination of folding mechanism, a platform spaced thereabove for receiving blanks to be folded, the same centrally apertured, a templet movable from above to below said platform through said aperture, means for withdrawing the templet from the folds of a blank, whereby it may be elevated above the platform to permit the insertion of a new blank while the folded blank is extricated laterally between the platform and folding mechanism; and a blank lifter for lifting the completed blanks to assist their aforesaid extrication; together with an outfeeding mechanism having blank engaging devices which operate between the platform and infolding mechanism.

74. In a folding machine, the combination of folding mechanism, a platform spaced thereabove for receiving blanks to be folded, the same centrally apertured, a templet movable from above to below said platform through said aperture, means for withdrawing the templet from the folds of a blank, whereby it may be elevated above the platform to permit the insertion of a new blank while the folded blank is extricated laterally between the platform and folding mechanism; and a blank lifter for lifting the completed blanks to assist their aforesaid extrication, and for subsequently rising to the platform to coöperate with the templet in transferring the new blank therefrom to the fold producing mechanism; together with an outfeeding mechanism having blank engaging devices which operate between the platform and infolding mechanism.

75. In a folding machine, the combination of folding mechanism, a platform spaced thereabove for receiving blanks to be folded, the same centrally apertured, a templet movable from above to below said platform through said aperture, means for withdrawing the templet from the folds of a blank, whereby it may be elevated above the platform to permit the insertion of a new blank while the folded blank is extricated laterally between the platform and folding mechanism; and a blank lifter for lifting the completed blanks to assist their aforesaid extrication, and for subsequently rising to the platform to coöperate with the templet in transferring the new blank therefrom to the fold producing mechanism; together with an outfeeding mechanism having blank engaging devices which operate between the platform and infolding mechanism; and a part as B, with connections for operating the said elements in harmony.

76. In a folding machine, the combination of folding mechanism, a platform spaced thereabove for receiving blanks to be folded, the same centrally apertured, a templet movable from above to below said platform through said aperture, means for withdrawing the templet from the folds of a blank, whereby it may be elevated above the platform to permit the insertion of a new blank while the folded blank is extricated laterally between the platform and folding mechanism, means for pressing the folded blanks in the place where folded after the withdrawal of the templet from the folds; and a blank lifter for lifting the completed blanks to assist their aforesaid extrication, and for subsequently rising to the platform to coöperate with the templet in transferring the new blank therefrom to the fold producing mechanism; together with an outfeeding mechanism having blank engaging devices which operate between the platform and infolding mechanism.

77. In a folding machine, the combination of folding mechanism, a platform spaced thereabove for receiving blanks to be folded, the same centrally apertured, a templet movable from above to below said platform through said aperture, means for withdrawing the templet from the folds of a blank, whereby it may be elevated above the platform to permit the insertion of a new blank while the folded blank is extricated laterally between the platform and folding mechanism, means for pressing the folded blanks in the place where folded after the withdrawal of the templet from the folds; and a blank lifter for lifting the completed blanks to assist their aforesaid extrication, and for subsequently rising to the platform to coöperate with the templet in transferring the new blank therefrom to the fold producing mechanism; together with an outfeeding mechanism having blank engaging devices which operate between the platform and infolding mechanism; and a part as B, with connections for operating the said elements in harmony.

78. In a folding machine having templet, folding and pressing mechanism, an auxiliary blank supporting platform above which unfolded blanks are positioned and below which they are folded, pressed and removed, said platform located above said folding mechanism with a space between the two; combined with a member movable below said platform taking part in the transfer of the blanks from the platform to the folding and pressing mechanism, and their removal after folding and pressing; together with an outfeeding mechanism having blank engaging devices which operate between the platform and infolding mechanism; and a part as B, with connections for operating the said elements in harmony.

In witness whereof, I have signed my name to this specification in the presence of two subscribing witnesses, on this 3rd day of October, A. D. 1907.

WALTER L. DIXON.

In presence of—
WILLIAM J. McLAUGHLIN,
THOMAS J. CARTY.